United States Patent [19]
Fletcher et al.

[11] 4,054,911
[45] Oct. 18, 1977

[54] INFORMATION RETRIEVAL SYSTEM FOR PROVIDING DOWNSTREAM LOADING OF REMOTE DATA AND PROCESSING CONTROL THEREOF

[75] Inventors: Maurice Fletcher, Sutton, England; Lenard Wintfeld, Astoria, N.Y.

[73] Assignee: IDR, Inc., Farmingdale, N.Y.

[21] Appl. No.: 692,355

[22] Filed: June 3, 1976

[51] Int. Cl.² .......................................... H04N 1/02
[52] U.S. Cl. .................................... 358/141; 358/86; 358/146
[58] Field of Search .................. 358/141, 86, 146; 360/35, 33

[56] References Cited
U.S. PATENT DOCUMENTS

| 3,369,073 | 2/1968 | Schulz | 358/146 |
| 3,488,435 | 1/1970 | Eilenberger | 358/146 |
| 3,609,227 | 9/1971 | Kuljian | 360/33 |
| 3,647,949 | 3/1972 | Closs | 358/257 |
| 3,649,749 | 3/1972 | Gibson | 358/146 |
| 3,889,054 | 6/1975 | Nagel | 358/141 |

Primary Examiner—Howard W. Britton
Assistant Examiner—Edward L. Coles
Attorney, Agent, or Firm—Hubbell, Cohen, Stiefel & Gross

[57] ABSTRACT

An information retrieval system capable of capturing packets or rows of video displayable data and/or control program instructions continuously transmitted in a common predetermined format, such as pseudo video scan lines, over a common predetermined video signal transmission media, such as television signal distribution means, captures these packets from a continuously transmitting remote data base comprising a plurality of different control programs and different data rows in order to provide a selected purpose variable function terminal with information display as well as particular type of processing thereof can individually be substantially simultaneously varied for each terminal of a plurality of terminals in the system. The control program instructions comprise a first plurality of continuously remotely transmitted diffferent selectable sets of microprocessor processing control instructions for the terminal for controlling the operation thereof to process the transmitted data in accordance therewith, and a common second set of continuously remotely transmitted instructions for controlling the loading of any selected one of the first plurality of selectable sets of microprocessor processing control instructions into a local storage means which is operatively connected to the microprocessor which is operable in accordance with said locally stored selected set of processor control instructions. The local storage means further comprises a common third set of stored retrieval control instructions for controlling the loading of the common second set of control instructions into the local storage means. By selection means, such as a keyboard, the user is capable of individually determining what video displayable information is to be received and how the particular user terminal which receives this information is to process it, such as selecting a video displayable row grabbing function for the terminal which would continuously update the video display on a real time row-by-row basis.

18 Claims, 11 Drawing Figures

INFORMATION RETRIEVAL SYSTEM FOR PROVIDING DOWNSTREAM LOADING OF REMOTE DATA AND PROCESSING CONTROL THEREOF

CROSS-REFERENCE TO RELATED APPLICATIONS

This application is an improvement on the system described in the commonly owned co-pending U.S. patent application entitled "Information Retrieval System Having Selectable Purpose Variable Function Terminal," filed Sept. 10, 1975, bearing U.S. Ser. No. 611,927, the contents of which are hereby specifically incorporated by reference in their entirety, as well as being an improvement on the system described in the commonly owned copending U.S. patent application entitled "Improved Row Grabbing System," filed Sept. 10, 1975, bearing U.S. Ser. No. 611,843, and on the row grabbing system described in the commonly owned previously issued U.S. Pat. No. 3,889,054, issued June 10, 1975.

BACKGROUND OF THE INVENTION

1. Field of the Invention

The present invention relates to information retrieval systems in which continuously transmitted information from a remote data base may be selectively grabbed or captured for obtaining the processing control instructions for a microprocessor controlled terminal as well as capturing selected data to be processed and displayed by that terminal with the selected purpose or processing control of the terminal being locally variable.

2. Description of the Prior Art

Computers and other types of programmable devices are well known in the data processing art and in the communications field in general. These prior art systems function in accordance with a stored set of instructions or programs or a series of programs, such as in a typical IBM Operating system or OS. In such systems, however, the programming is accomplished at the central computer whose function may be varied only by variation in the program which is loaded thereinto. Due to the high cost of computers, the art of time sharing has developed, which, through teleprocessing, has enabled a plurality of users to share a common centrally located computer by use of remote input/output devices. However, such time sharing still requires the users to be bound by the particular program which is stored in the central computer so that the plurality of users essentially share the same program functions which process their individual data inputs in accordance therewith. There are some prior art systems which are capable of obtaining a remotely stored program, however, no such systems are known to the inventors, other than that described in the commonly owned co-pending U.S. pat. application Ser. No. 611,927, filed Sept. 10, 1975, entitled "Information Retrieval System Having Selectable Purpose Variable Function Terminal," which are capable of both receiving selectable continuously transmitted frame or row grabbable video displayable data as well as continuously transmitted control instructions for processing such data over a common television distribution system normally used for such data, nor are any such systems known to the inventors in which remote local terminals connected to a remote central data source in such a common television distribution system can function in accordance with any one of a plurality of locally selected purposes or functions to provide a selected purpose variable function terminal in which the selected purpose or function may be locally varied electronically without the user having to actually reprogram his terminal. Moreover, there are no such terminals known to the inventors in which a video communication system which enables the video display of information, such as over a CATV system, may also be converted to such a local selectable purpose variable function terminal in which desired control programs may be electronically called up or retrieved from a remote central processor for local storage and operation in accordance therewith wherein both the data and the program information are transmitted as pseudo video scan lines, each containing a complete self-contained packet of information. Such a video communication system in which individual frames may be grabbed for video display thereof and updated on a row-by-row basis is described in the commonly owned previously issued U.S. Pat. No. 3,889,054, issued June 10, 1975, in which pseudo video digital data scan lines are transmitted continuously from a central data source in a one way communication system. Such a system may be controlled locally by a microcomputer as described in the co-pending U.S. Pat. application entitled "Improved Row Grabbing System," filed Sept. 10, 1975, bearing U.S. Ser. No. 611,843. As will be described herein, such video communication systems, as those employing a local microcomputer, have not been utilized to full advantage as a selectable purpose variable function terminal in which processing of data in accordance with any desired selected function, which may be varied, can be accomplished as well as the display of video data therefrom. The present invention is an improvement on such systems, as well as on the aforementioned U.S. Pat. application Ser. No. 611,927, so as to provide such an improved selectable purpose variable function terminal.

SUMMARY OF THE INVENTION

An information retrieval system comprising a remote information source for remotely continuously transmitting information in a common predetermined format over a common predetermined video signal transmission media in which the information comprises continuously transmitted video displayable data and a plurality of continuously transmitted different sets of control instructions for a local selectable purpose variable function terminal operatively connected to the remote information source via the common video signal transmission media for selectively receiving the remotely continuously transmitted information is provided. Each of the sets of control instructions corresponds to a different selectable purpose for the terminal with at least one of the purposes corresponding to control of the processing of the continuously transmitted video displayable data for providing a processed video display thereof. The terminal comprises microprocessor or microcomputer means for controlling the operation thereof to process the transmitted video displayable data in accordance therewith with this microprocessor means being operatively connected to the video signal transmission media for receiving the remotely continuously transmitted information. The different sets of control instructions comprise different sets of control instructions for the microprocessor means for varying the operation thereof to vary the type of processing of the transmitted video displayable data by the terminal in accordance therewith. Selection means, such as comprising a keyboard, a comparator means and a buffer storage means, are operatively connected to the microprocessor means for variably selecting the data to be processed for providing the processed display as well as for providing a first selectable purpose for the terminal for controlling the processing of the data in accordance therewith from a plurality of different selectable purposes for the terminal, these selectable purposes being variable. Local storage means, such as a random access memory means and a read only memory means, are provided for selectively retrievably locally storing both the selected remotely transmitted video displayable data and the selected first one of the remotely transmitted selected set of control instructions for the microprocessor means corresponding to the first selected purpose for the terminal. This local storage means is operatively connected to the microcomputer means with at least the selected data storage therein being continuously updateable in response to the remotely continuously transmitted data being updated. Video display means are operatively connected to the microcomputer means for displaying said processed video display. The microcomputer or microprocessor means is operable in accordance with the locally stored remotely transmitted selected first one of the selectable sets of control instructions and selectively enables the processed video display of the selected remotely continuously transmitted updateable video displayable data which is processed in the terminal in accordance with the locally stored remotely transmitted selected first one of the selected set of control instructions for providing the processed video display therefrom on the display means. The selection means enables local storage in the local storage means of a different one of the plurality of remotely transmitted sets of instructions in place of the first one of the locally stored selected remotely transmitted selected sets of instructions in response to selection of a different selected purpose in which instance the microcomputer means differently processes the incoming video displayable data in accordance with the different locally stored set of instructions for the microcomputer means, whereby a local downstream program grabbing and data display means for remotely transmitted information is provided.

The continuously remotely transmitted plurality of different sets of control instructions comprises a first plurality of continuously remotely transmitted different selectable sets of microprocessor processing control instructions for the terminal and a common second set of continuously remotely transmitted control instructions for controlling the loading of any selected one of the first plurality of selectable sets of microprocessor processing control instructions into the local storage means. The local storage means comprises a common third set of stored retrievable control instructions for controlling the loading of the common second set of control instructions into the local storage means with this selected one of the loaded first plurality of selectable sets of processing control instructions corresponding to the aforementioned first selectable purpose for the terminal for controlling the processing operation of the selected continuously remotely transmitted video displayable data by the terminal in accordance therewith to provide the processed video display thereof. The selection means enables the loading of the common second set of control instructions and the subsequent loading of the selected one of the first plurality of microprocessor processing control instructions in response to the selection of the selected one of the first plurality of microprocessor processing control instructions. The aforementioned comparator means and buffer storage means are operatively connected to the video signal transmission media for receiving the continuously remotely transmitted information and for controlling the loading of the appropriate portions of this information, whether it be selected control instructions or selected video displayable data, into the local storage means. Both the data and the sets of control instructions are transmitted as pseudo video scan lines, each of which has a television video scan line format and is capable of comprising a complete self-contained packet of digital information sufficient to provide an entire displayable row of video data characters in the instance of data, and a packet of digital information sufficient to provide at least a portion of one of the sets of instructions in the instance of control instructions, each of the pseudo video scan lines preferably having an associated transmission time equivalent to that of a television video scan line. It should be noted that the terms pseudo video scan line and television video scan line as used throughout the specification and claims are being utilized as defined in U.S. Pat. No. 3,889,054. The information retrieval system may function as a row grabbing video display terminal, such as the type described in U.S. Pat. No. 3,889,054, in which the continuously video displayable selectable frame is updated on a displayable video row-by-row basis dependent on the real time data information content of the received pseudo video scan line pertaining to the selected data if the selected set of processing control instructions corresponds to said row grabbing function. Thus, the terminal of the present invention provides an information retrieval system capable of capturing packets or rows of data and/or control program instructions from a continuously transmitting remote data base comprising a plurality of different control programs and different data rows to provide a selectable purpose variable function terminal whose information display as well as the particular type of processing thereof to provide the processed information display can individually be substantially simultaneously varied for each terminal of a plurality of terminals so that every user is not only capable of individually determining what video displayable information is to be received, but also how the particular user terminal which receives this information is to process it, all of which is continuously remotely transmitted over a common television distribution system which would be normally utilized for the video information.

DETAILED DESCRIPTION OF THE PREFERRED EMBODIMENT

Figure 1:
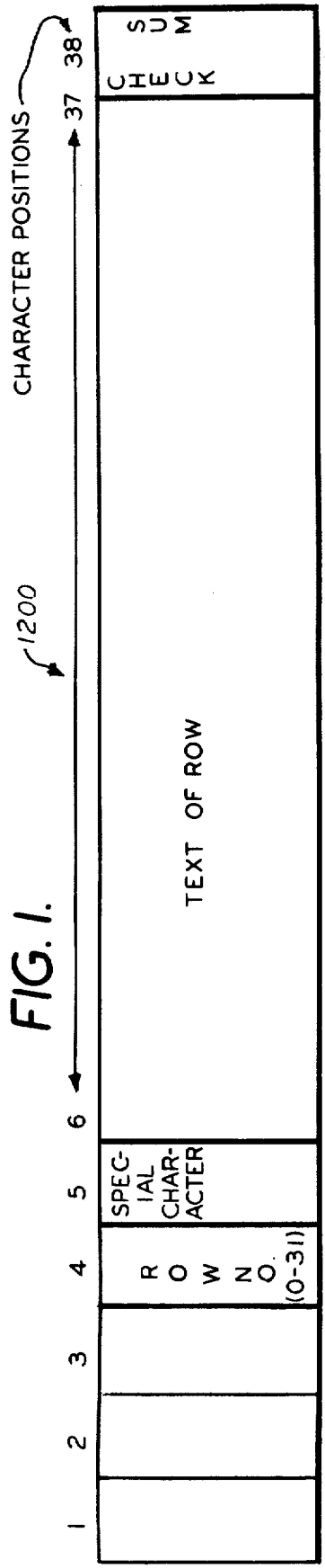
FIG. 1 is a diagrammatic illustration of a typical pseudo video scan line format corresponding to a packet of video displayable data in accordance with the present invention.
Figure 7:
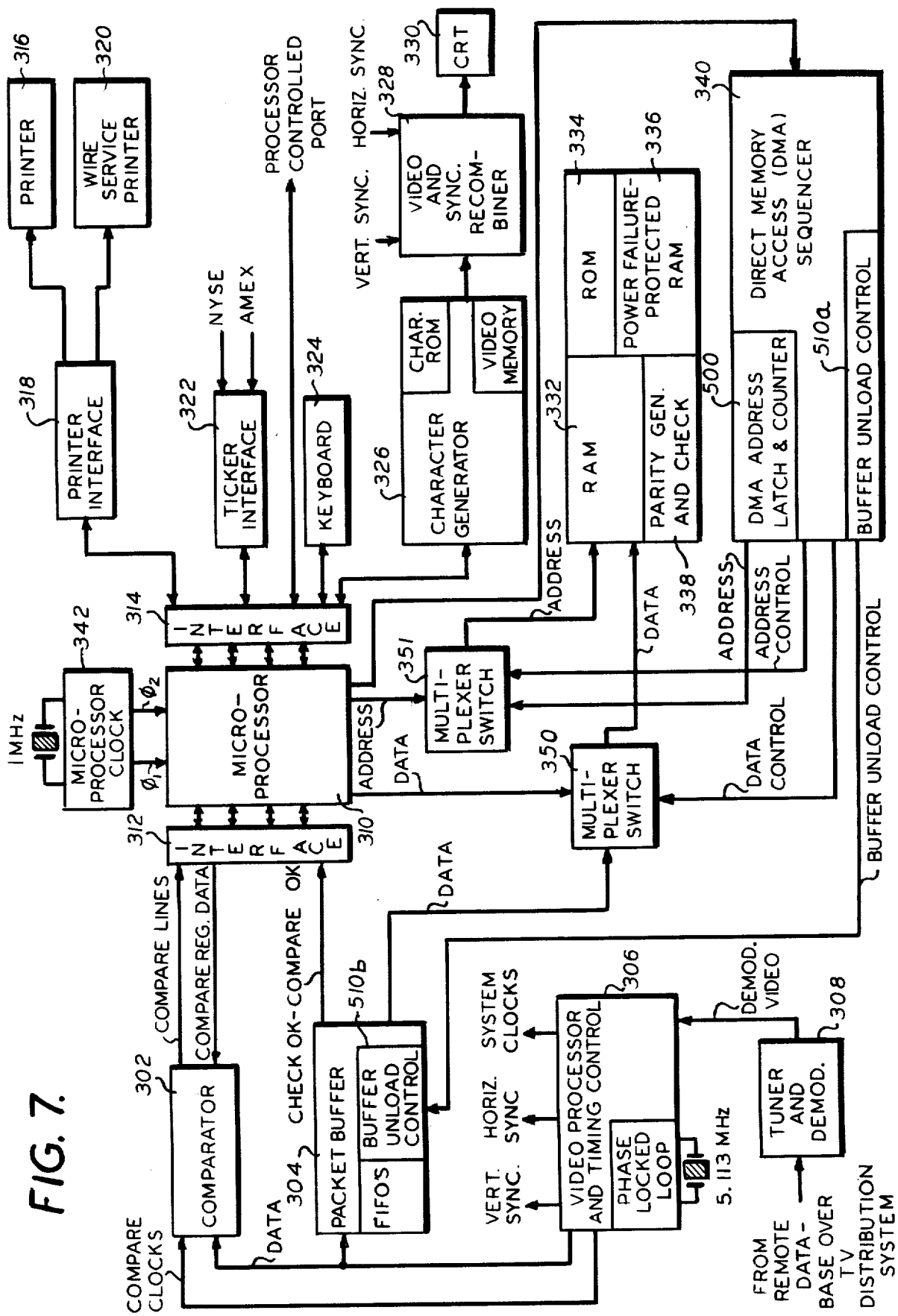
FIG. 7 is a functional block diagram of the preferred system of the present invention operated in accordance with the logic flow diagrams of FIGS. 4 through 6 for processing remotely transmitted information having the formats illustrated in FIGS. 1 through 3.

Referring now to the drawings in detail and initially to FIG. 7, the preferred downstream program loading system of the present invention, generally referred to by the reference numeral 300, is shown. As shown and preferred in FIG. 7, and as will be described in greater detail hereinafter, the system 300 preferably includes a conventional display device 330, with the system 300 preferably being capable of operating in the same manner as a row grabbing terminal of the type previously described in commonly owned U.S. Pat. No. 3,889,054 and U.S. Pat. application Ser. No. 611,843, filed Sept. 10, 1975, which descriptions are specifically incorporated by reference herein in their entirety, when the control program which is grabbed corresponds to the functioning of such a row grabbing terminal. In addition, the system 300 is an improvement on the system described in commonly owned U.S. pat. application Ser. No. 611,927, filed Sept. 10, 1975, the contents of which are also specifically incorporated by reference herein in its entirety. For purposes of explanation, we shall describe the system 300 in terms of such a row grabbing terminal receiving its operating or control program from a remote data base, such as a central data base source for a plurality of such terminals, with the row grabbing terminal calling up or grabbing the desired operating or control program therefor. By way of example, we shall describe this call up operation with respect to remote storage of the control program for allowing the row grabbing terminal to operate in the fashion described in the aforementioned patent and patent applications with respect to a row grabbing function although, of course, it should be understood that any other type of operating or control program could be called up or grabbed in the preferred system 300 of the present invention so as to have the row grabbing terminal process data in whatever desired fashion is mandated by the called up or grabbed control program. As will be described in greater detail hereinafter, the downstream program loading system 300 is preferably capable of providing row grabbing information comprising pseudo video scan lines of the type described in the aforementioned patent and patent applications and shown by way of example in FIG. 1, which may be grabbed to provide video displayable data or information which is updateable on a video row-by-row basis as well as also additionally grabbing control programs which are preferably transmitted in essentially the same pseudo video scan line type of format, as shown by way of example in FIG. 2, for data.

Before describing the structure of the system 300, for purposes of explanation, we shall describe the functioning of the system 300 to enable its operation as a downstream program loading system in terms of the downstream loading of a conventional control program for enabling the terminal 300 to function as a row grabbing terminal of the type described in the aforementioned patent and patent applications. Initially referring now to FIG. 1, a diagrammatic illustration of a typical pseudo video scan line 1200 containing a video displayable row of data which is transmitted to and grabbed by such a row grabbing terminal is shown. As shown by way of example, this typical pseudo video scan line 1200 preferably comprises 38 characters with the 38th character preferably being the check sum for insuring the integrity of the transmission. The first three characters, by way of example, are preferably assigned to the frame or page number for the displayable row. The desired page is preferably conventionally selected on the keyboard 324 (FIG. 7) so that the appropriate selected page is subsequently displayed on the display device, such as a conventional CRT 330 associated with the row grabbing terminal 300. The 4th character is preferably assigned to the row number which can preferably be any number from zero to 31, by way of example, which number defines the position of the transmitted data or text on the CRT 330 screen, the least significant bit preferably implying a position to either the left or the right of the display screen 330 and the balance of the information contained in this row number 4th character implying which of the lines (displayable rows) 1 through 16 of text display in the 16 line preferred display the specific row is. The 5th character of the transmitted row or pseudo video scan line 1200 is preferably the special character which, in the instance when the pseudo video scan line comprises a video displayable row of data, implies that the informatiom is a video row as well as the specific details associated with the type of row which is being transmitted. For example, these details may comprise whether the row is a 32 or 64 character row if the terminal is, as previously described in the aforementioned patent and patent applications, capable of displaying both 32 and 64 character rows. Characters 6 through 37 of the 38 character pseudo video scan line 1200 preferably contain the data or text associated with the video displayable row which is to be displayed on the CRT 330 with the 38th character, as previously mentioned, preferably containing the check sum. Thus, as described in even greater detail in the aforementioned patent and patent applications, this is the preferred information format of a typical normal video packet or pseudo video scan line of information which is transmitted from the remote data base downstream through the conventional coaxial cable link, such as used in a CATV system, through conventional television distribution equipment, to the row grabbing terminal 300.

Figure 2:
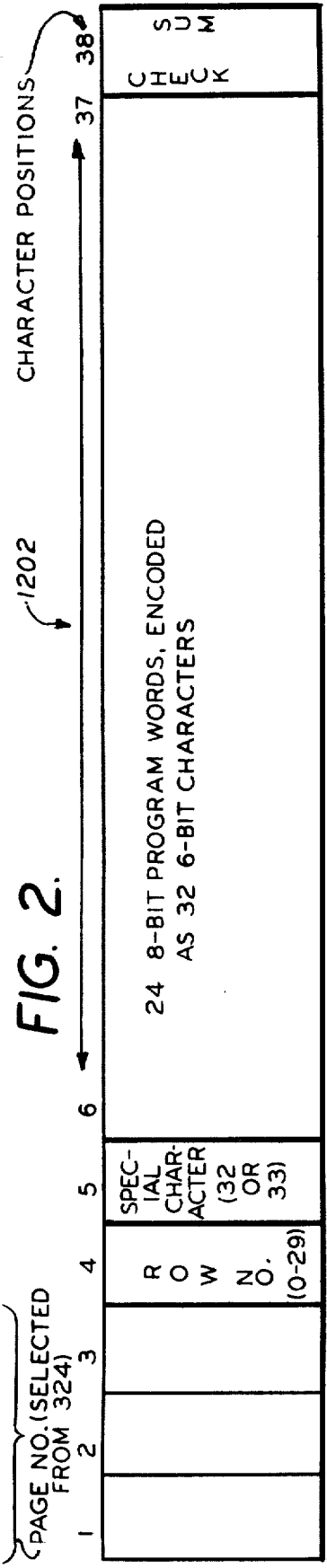
FIG. 2 is a diagrammatic illustration similar to FIG. 1 of a typical pseudo video scan line format corresponding to a packet of control instructions in accordance with the present invention.

Preferably, a "row" of a control program which may be called up from the remote data base is transmitted in the same pseudo video scan line format as a video displayable row of data down the coaxial cable from the remote data base to the row grabbing terminal 300, the terminal 300 identifying the type of pseudo video scan line or row by the special character transmitted therewith, as will be described in greater detail hereinafter. FIG. 2 diagrammatically illustrates such a typical preferred program "row" format which is transmitted down the coaxial cable. Preferably, such a typical program "row" 1202 also comprises 38 characters so as to be consistent in format with the aforementioned conventional pseudo video scan line 1200 or video displayable row of data. The 38th character preferably comprises the check sum for insuring the integrity of the transmission. The first 3 characters preferably comprise the program "page" number although, as will be described in greater detail hereinafter, these 3 characters or page number preferably having no significance, however, for the "software bootstrap," which will be described in greater detail hereinafter. Suffice it to say at this time that the "software bootstrap" is preferably common for any downstream transmitted control program which is to be loaded into the terminal 300 and, as will be described in greater detail hereinafter, is preferably the "software bootstrap" effectively being the overriding controller which determines which specific remotely transmitted control program is to be loaded into the row grabbing terminal 300. When the program "row" contains control program information, such as a set of program instructions, these first 3 characters which preferably define the program page number, are preferably utilized to determine if the particular program packet is meant for that specific row grabbing terminal 300, a plurality of such terminals preferably substantially simultaneously receiving all of said continuously transmitted program rows while only grabbing those packets or program rows which are identified as belonging to the specific terminal 300 which requests them in the preferred system of the present invention. The 4th character, which was previously identified as belonging to the row number of a video displayable row of data, preferably defines program rows zero to 29, by way of example, for each transmitted program page, thereby providing 30 packets for a transmitted program page of program information, by way of example. The aforementioned "software bootstrap" is preferably contained in one program page of transmitted information; that is, in 30 transmitted rows or packets, and preferably, by way of example, comprises 720 program words, 24 program words, by way of example, preferably being contained in each packet of program information in the system of the present invention. The transmitted control or main program which is selectively received by the row grabbing terminal 300 is preferably contained in 7 consecutive program pages, the first program page of this main program preferably being a onceonly initialization program, to be described in greater detail hereinafter, of 720 words and the last 6 program pages of the 7 consecutively numbered program pages preferably containing the system control program which preferably comprises 4,096 program words to the total amount of 4,320 possible program words which could be contained in 6 program pages. Thus, the last few transmitted program rows may be excluded in receiving the system control or operation program by the terminal 300, as will be described in greater detail hereinafter. The 5th character of the program row 1202, as with a data row 1200, preferably defines a special character and, preferably, by way of example, if this character is a 32, it implies that the transmitted program packet is the aforementioned software bootstrap whereas if this character is a 33, by way of example, it implies that the transmitted program packet comprises information associated with the main or control program. Characters 6 through 37 of program row 1202 preferably contain the twenty-four 8 bit program words, by way of example, which are preferably encoded as thirty-two 6 bit characters. This aformentioned encoding is accomplished because the video displayable characters for a normal video displayable row of data 1200 which are characters 6 through 37, as previously mentioned, are preferably each 6 bit characters, whereas each of the program words of a program row or packet are each preferably 8 bit words. The 38th character, as previously mentioned, is the check sum character.

As will be described in greater detail hereinafter, both the software bootstrap and the main or control program packets are preferably captured by the system 300 by recognition of the aforementioned special character in the 5th character position of program row 1202, recognition of the character 32 relating to capture of the software bootstrap and recognition of character 33 relating capture of the main program packets, by way of example. Preferably, there is only one software bootstrap remotely stored in the data base since this software bootstrap, as previously mentioned, in common to all programs which are to be captured by the row grabbing terminal 300. Since there is only one software boostrap preferably stored in the data base, each of the program packets associated with this software bootstrap can preferably be placed in position in the program memory 332 (FIG. 7) of the row grabbing terminal 300 unambiguously by its respective associated row number alone, the location of each packet associated with the software bootstrap preferably being uniquely and readily defined by the row number associated with a particular packet. Accordingly, as previously mentioned, since the software bootstrap contains row numbers zero through 29, by way of example, each of these 30 packets can be uniquely stored in the program memory 332 in locations identified by these 30 associated row numbers zero through 29. With respect to the main or control program for the terminal 300, however, there preferably are several different selectable main programs remotely stored on the central data base simultaneously. Thus, the terminal 300 must be able to identify which of the several different selectable main or control programs are being provided to it so that it can insure that only the program packets associated with the specific main or control program which is being called up by that terminal 300 are stored in the program memory 332 of the terminal 300.

In order to accomplish this, the terminal 300 identifies the correct or authorized selected main or control program from a permission message, which is preferably directed to the terminal 300, which message, by way of example, relates to groups zero through 127, of the conventional row grabbing system of the type described in the aforementioned patent which, by way of example, normally preferably has display groups zero through 1,000, to provide permission or authorization for receipt of selected downstream programs by the terminal 300. Each of the permission packets of information, which there may preferably normally be 16 such packets, by way of example, with 8 of these 16 permission packets preferably being associated with groups zero through 1,000 and with the other 8 of these 16 packets preferably being associated with pages zero through 1,000 of those groups, is associated with a particular set of 128 groups or pages. A typical such permission packet is diagrammatically illustrated in FIG. 3 and shall now be described. The permission "row" 1204, like the aforementioned program "row" 1202, is preferably transmitted downstream from the remote data base via the cable link in the same pseudo video scan line format as a video displayable row of data 1200. Thus, a typical permission "row"]1204 preferably comprises 38 characters which, as previously mentioned, is preferred for any of the information packets, such as data or program, which are preferably transmitted in the system 300 of the present invention. The first 3 characters of permission row 1204 preferably comprise a unique terminal number or tag so as to identify the specific terminal 300 which is to receive this permission packet. The 4th character position, which is the aforementioned row number location, preferably contains the character 32, by way of example, when the permission packet 1204 is associated with the aforementioned groups zero through 127, this number, of course, normally being different for other groups than the aforementioned groups zero through 127. The 5th character position, which is the aforementioned special character is, preferably normally a zero, by way of example, for the permission packet 1204. The 6th character position is preferably utilized for special permission bits, such as those bits associated with a particular mode of operation of the terminal 300. Characters 7 through 28 preferably comprise 128 possible permission bits, with a different permission bit preferably being associated with each of the 128 different groups comprising the aforementioned groups zero through 127. Characters 29 through 31 of permission row 1204 preferably comprise the page number associated with the first page of the specific main or control program which is to be grabbed by that specific terminal 300 and are used by the terminal to identify which of the several different main or control programs being transmitted downstream from the remote data base is the correct one to be grabbed. Characters 32 through 37 are preferably utilized for other types of special permission messages defining, for example, the types of display the screen 330 is capable of providing, etc. The 38th character, as in the instance of a data row 1200 or a program row 1202, preferably comprises the check sum character.

Figure 3:
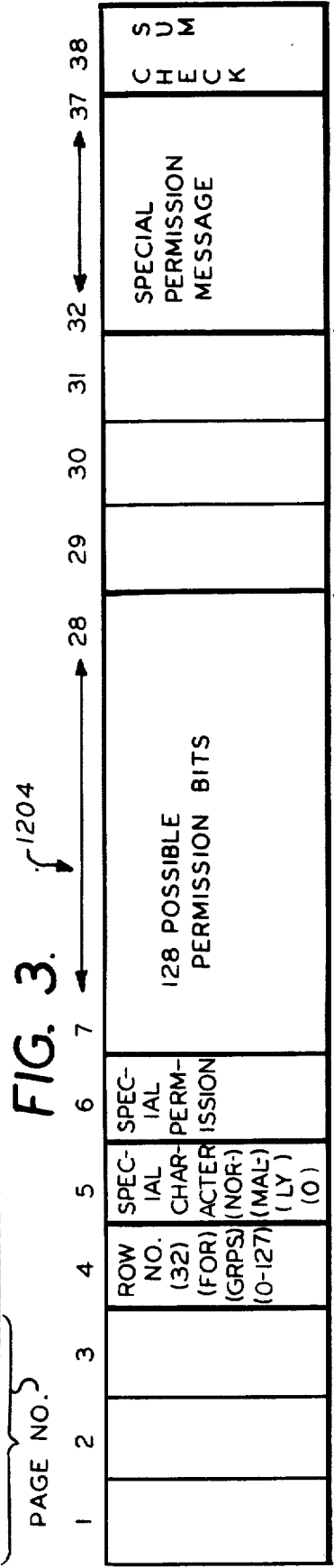
FIG. 3 is a diagrammatic illustration similar to FIG. 1 of a typical pseudo video scan line corresponding to a packet of a permission message in accordance with the present invention.

After the terminal 300 receives its designated permission message of the type illustrated in FIG. 3, the terminal 300 is then ready to receive a specific main or control program from the remote data base. Assuming that the software bootstrap has already been loaded into the program memory 322, as will be described in greater detail hereinafter, the terminal 300 will boot or load in the selected main or control program, as determined by this specific permission message, particularly characters 29 through 31, preferably one program page, that is 720 program words, at a time, starting from the initial program page number which is defined in these characters 29 through 31 of the permission packet 1204. Terminal 300 then preferably continues to load the next 6 consecutively numbered program pages after capturing the first program page defined in the aforementioned characters 29 through 31 of the permission packet for a total of 7 consecutively numbered program pages, as previously described with reference to FIG. 2, the 7 consecutively numbered program pages preferably containing the entire main or control program. The first program page which is loaded into the program memory 332 of the terminal 300 of the selected main or control program preferably comprises a special portion of this main or control program which special portion is the aforementioned once-only initialization program comprising 720 program words. This once-only initialization program is preferably utilized only once at the start of the downstream program loading operation by the terminal 300 in order to reset the information stored in the program memory 332 of the terminal 300, as well as to reset the various other portions of the terminal 300 necessary for initializing the terminal 300 so that it is in condition to operate in accordance with the selected main program after it has been retrieved or downstream loaded into the program memory 332. This first loaded program page is then preferably written over in memory 332 by subsequently provided data information since this first program page is preferably loaded into the portion of the memory 332 which is normally assigned to such data as opposed to the portion which is preferably specifically assigned to storage of the main or control program for the terminal 300. Preferably, this initialization portion of the main or control program is written into, by way of example, memory 332 locations D$\phi\phi$ through FCF, which defines their locations in conventional hexadecimal notation. The memory itself, by way of example, preferably comprises 8,000 program words, with the aforementioned hexadecimal location comprising 720 of those 8,000 program words. The next 6 consecutively numbered program pages, as previously mentioned, preferably comprise the system control program which, as also previously mentioned, preferably comprises 4,096 program words. This system control program is preferably written into the memory 332 locations assigned to storage of the terminal operating or control program, such as locations 8000 through 8FFF, by way of example, which define these locations in conventional hexadecimal notation, occupying 4.096 program words of the aforementioned 8,000 word total.

The aforementioned software bootstrap which will be described in greater detail hereinafter, is preferably initially loaded into the program memory 332 prior to the loading of the aforementioned main or control program as well as prior to receipt of the relevant permission packet 1204, and is preferably written into the memory 332 locations associated with data storage, the software bootstrap preferably being over written by data as is the once-only initialization program contained in the first program page of the main program. Preferably, by way of example, this software bootstrap may be loaded into memory locations 800 through ACF which define these locations in conventional hexadecimal notation, occupying 720 program words of the aforementioned 8,000 word total. As was also previously mentioned, the last word or character of the aforementioned 720 program words associated with the software bootstrap, the last word or character of the first program page once-only initialization portion of the program and the last word or character of the balance of the main or control program contained in the 6 consecutively numbered program pages, preferably each comprises a check sum which, as will be described in greater detail hereinafter, is preferably, by way of example, an exclusive OR of all of the preceding words associated with that particular software bootstrap, first program page once-only initialization portion of the program and remaining 6 consecutively numbered program pages of the main program, respectively, and is conventionally utilized to check the correct loading of each of these program portions, as will be described in greater detail hereinafter.

Figure 4:
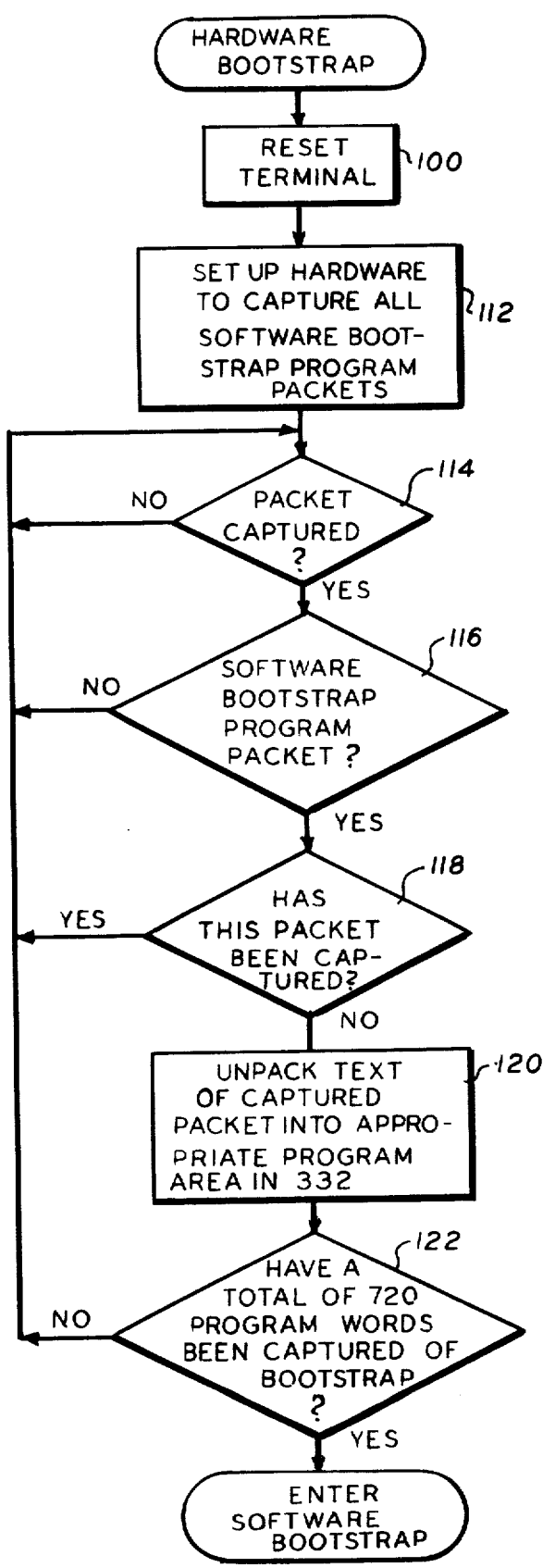
FIG. 4 is a logic flow diagram of the preferred hardware bootstrap program for use in the system of the present invention.

Referring now to FIG. 4, a logic flow diagram of the preferred hardware bootstrap program which is preferably permanently stored in the read only memory portion 334 (FIG. 7) of the terminal 300, to be described in greater detail hereinafter, is shown. This hardware bootstrap is preferably automatically put into operation by microprocessor 310 (FIG. 7) with turn on of the terminal 300. The specific purpose of the hardware bootstrap program illustrated in FIG. 4 is to enable the loading of the aforementioned software bootstrap program which will be described in greater detail with reference to FIG. 5. As shown and preferred in FIG. 4, upon initial operation of the microprocessor 310 of terminal 300 under control of the hardware boostrap program, initialization of those portions of the terminal 300 which are required for the loading of the software bootstrap to be described with reference to FIG. 5 occurs. This functional step in the logic flow diagram of FIG. 4 is identified by referenced numeral 100. After the appropriate portions of the terminal 300 have been reset, microprocessor 310 under control of the hardware bootstrap then preferably causes the terminal 300 to be set up to capture all software bootstrap packets 1202, this control information comprising specific instructions (signals) to the various portions of the terminal 300 to enable the capture of the software bootstrap packets, the terminal 300 recognizing and capturing the software bootstrap packets whose format is of the type previously described with reference to FIG. 2 in response to recognition of special character 32, as previously mentioned. This functional portion of the logic flow diagram is identified by reference numeral 112. As further shown and preferred in FIG. 4, the terminal logic under control of microprocessor 310 must then make a determination whether or not any packet of any type has been captured, this function being represented by reference numeral 114. If no packet of any type has been captured, then as illustrated in FIG. 4, an iterative control loop is formed until a packet is captured. After this occurs, the terminal logic must then determine whether or not the captured packet is a software bootstrap packet, which function is identified (FIG. 4) by decision symbol 116. If the captured packet is not a software bootstrap packet, then, once again, another iterative control loop is formed until a captured packet satisfies the logic that it is a software bootstrap packet as identified to the logic by the presence of special character 32 in the 5th character position of the captured program "row" 1202. When the logic has determined that a software bootstrap packet has been captured, it then determines whether or not this particular captured software bootstrap packet, as identified by its assigned row number, of the aforementioned 30 packets which comprise the complete software bootstrap program, has previously been captured. This function is represented by decision symbol 118 in FIG. 4. This particular aforementioned software bootstrap packet may have been previously captured due to an error in transmission and, since the software bootstrap packets are preferably continuously retransmitted in the preferred system on the present invention, it is possible that if one or more of such software bootstrap packets is skipped, it can be picked up on the next cycle of transmission of such software bootstrap packets and, similarly, the terminal 300 may have previously picked up and loaded that particular software bootstrap packet on one of the previous cycles of transmission of such software bootstrap packets before the complete software bootstrap has been loaded. If such a software bootstrap packet has already been captured then, once again, preferably an iterative control loop is formed until a software bootstrap packet is captured by the logic which has not previously been captured. When this occurs, that is when a software bootstrap packet is captured which has not been previously captured, then the terminal 300 packs or loads the text of this software bootstrap packet, which is preferably contained in characters 6 through 37 of the software bootstrap packet 1202, as previously discussed with reference to FIG. 2, into the proper position in the aforementioned program memory portion 332 in accordance with the particular row number of the 30 possible row numbers associated with a single software bootstrap packet 1202, which row number is contained in the 4th character position. As was also previously mentioned, this software bootstrap packet is preferably written into a normally assigned data area of the memory 332 for subsequent overwriting by data. This function is represented by symbol 120 in FIG. 4. When the aforementioned particular software bootstrap packet has been unpacked or loaded into the appropriate memory 332 area, the logic then determines whether or not a total of 720 program words, as previously mentioned, define the entire or complete software bootstrap program. This function is represented by symbol 122. If the total of 720 program words has not been captured, then, once again, another iterative control loop is formed and the microprocessor 310 under control of the hardware bootstrap continues to control the logic until such time as the total 720 program words of the software bootstrap program have been captured. When these 720 program words have been captured, microprocessor 310 then controls the logic in accordance with the software bootstrap program illustrated, by way of example, in the logic flow diagram of FIG. 5, to be described in greater detail hereinafter. A typical program listing of the aforementioned hardware bootstrap program is provided below. The program is preferably written, by way of example, in M6800 assembler language, which is a conventional Motorola assembler language, for use by a conventional Motorola M6800 computer, such as microprocessor 310, the program listing using the conventional symbols which are defined in the Motorola M6800 assembler programming manual.

```
M6800 ASSEMBLER    V004      IHR ZP INITIALISATION SEGMENT 3/22/76

2709      8490    WP      EQU      *
 2710      9967            ORG      WR
 2711              *
 2712              *       XISTR1
 2713              -       --  -  -
 2714              *HARDWARE BOOTSTRAP
 2715              *HELD IN ROM:
 2716              *    RESETS MPU & CLEARS DATA MEMORY
 2717              *    SETS UP NECESSARY PIN'S (FRONT-END ONLY + CLEARS ALL CR'S)
 2718              *    RESETS CAPTURE REGISTERS FOR SOFT BOOT & PROGRAM ONLY
```

```
2719                    * CAPTURES & UNPACKS SOFTWARE BOOTSTRAP (720 WDS)
2720                    *  ENTERS SOFTWARE BOOTSTRAP
2721                    *
2722                    *INIT MPU
2723  9967 OF     XISTRT SEI
2724  9968 8E 0105      LDS      #TESTKD
2725                    *INIT DATA MEMORY & PIA CR'S
2726  996B CE 2000      LDX      #$2000       (0 IS 1ST WORD CLEARED)
2727  996E 6F 00  BIS010 CLR     X
2728  9970 09           DEX
2729  9971 26 FB        BNE      BIS010
2730                    *INIT NECESSARY PIA'S
2731  9973 CE FF2C      LDX      #FFNCR0*256+FFNCRC
2732  9976 FF 1202      STX      PFNCR        INIT NCR PIA
2733  9979 CE E03F      LDX      #FFCTBD*256+FFNCRH
2734  997C FF 1400      STX      PIDFE        DISABLE F-E &
2735  997F CE 4037      LDX      #FFCCR*256+FFNCRL
2736  9982 FF 1400      STX      PIDFE        CLEAR CR RAM ADDRESS
2737  9985 CE 012C      LDX      #FVRWLD*256+FVRWLC
2738  9988 FF 1402      STX      PVRWL        INIT CTO-6 PIA (& RWL PIA)
2739  998B CE 3F2F      LDX      #FFDMAD*256+FFDMAC
2740  998E FF 1602      STX      PFDMA        INIT DMA & INIT PIA
2741                    *INIT DATA
2742  9991 86 7F        LDA  A   #$7F         RESET CAPTURE REGISTERS
2743  9993 CE 0048      LDX      #DFCRA+14
2744  9996 A7 00  BIS020 STA A   X
2745  9998 09           DEX
2746  9999 8C 0033      CPX      #DFCRW
2747  999C 26 F8        BNE      BIS020
2748  999E CE 2120      LDX      #@41*256+@40 CR'S FOR S/B & PROG
2749  99A1 DF 33        STX      DFCRW
2750  99A3 86 1E        LDA  A   #30          PACKET COUNT
2751  99A5 97 C8        STA  A   W3I
2752  99A7 86 08        LDA  A   #8
2753  99A9 97 82        STA  A   W1J1         SOFT BOOT S.A. B8-15 (FOR SIUNPK)
2754                    *START F-E WHEN INIT OVER
2755  99AB F6 1602 BIS030 LDA B  PINIT        WAIT FOR INIT TO END
2756  99AE 2B FB        BMI      BIS030       (& CLEAR PRTY ERROR FLAG)
2757  99B0 4A           DEC  A
2758  99B1 B7 1602      STA  A   PFDMA        SEND DMA ADDRESS TO F-E
2759  99B4 BD 99B2      JSR      SFNCR        SEND NCR'S & ENABLE F-E
2760  99B7 C6 OE        LDA  B   #14          WAIT FOR CR XFER
2761                    *CAPTURE SOFTWARE BOOTSTRAP
2762  99B9 D7 83  BIS040 STA B   W2J1
2763  99BB 5A    BIS050 DEC  B
2764  99BC 27 FB        BEQ      BIS040       CR XFER OVER?
2765  99BE B6 1401      LDA  A   PFPKT        WAIT FOR PKT CAPTURE
2766  99C1 2A F8        BPL      BIS050
2767  99C3 B6 1400      LDA  A   PFCTB        CLEAR PKT FLAG
2768  99C6 96 83        LDA  A   W2J1
2769  99C8 26 07        BNE      BIS060       IGNORE CAPTURES ON OLD CR'S
2770  99CA B6 1402      LDA  A   PFCTA
2771  99CD 85 04        BIT  A   #4
2772  99CF 26 07        BNE      BIS070       SOFTWARE BOOTSTRAP?
2773  99D1 86 07  BIS060 LDA A   #7
2774  99D3 B7 1602      STA  A   PFDMA        GET NEXT PACKET
2775  99D6 20 E3        BRA      BIS050
2776  99D8 7F 01C2 BIS070 CLR    $1C2         GET PACKET ROW
2777  99DB FE 01C2      LDX      $1C2
2778  99DE 6D 00        TST      X
2779  99E0 26 EF        BNE      BIS060       GOT THIS PACKET ALREADY?
2780  99E2 6C 00        INC      X            MARK PACKET GOT NOW
2781  99E4 B6 01C3      LDA  A   $1C3         GET PACKET ROW
2782  99E7 CE 01C0      LDX      #$1C0        GET PACKET ADDRESS
2783  99EA 8D 08        BSR      SIUNPK       UNPACK PACKET
2784  99EC 7A 00C8      DEC      W3I
2785  99EF 26 E0        BNE      BIS060       MORE TO COME?
2786  99F1 7E 0800      JMP      XIBOOT       ENTER SOFTWARE BOOTSTRAP
2787                    *
2788         99F4 WR    EQU      *
2789         849C       ORG      WP
```

```
2791            849C  WP       EQU    *
2792            99F4           ORG    WR
2793                  *
2794                  *        SUNPK
2795                  *        -----
2796                  *UNPACK PROGRAM PACKET
2797                  *        ACCA = "ROW" # (0-170)
2798                  *        IX = ADDRESS OF PACKET
2799                  *        W1J1 = BS-15 OF ADDRESS OF 1ST WORD OF PROGRAM
2800                  *        STACK MUST ONLY CONTAIN RETURN ADDRESS
2801                  *        I MUST BE SET
2802                  *ON EXIT, ACCA/B DESTROYED, IX = IX-$20
2803                  *
2804  99F4 5F         SUNPK    CLR    B              GET PROG ADDR FOR THIS ROW:
2805  99F5 48                  ASL    A
2806  99F6 59                  ROL    B
2807  99F7 48                  ASL    A
2808  99F8 59                  ROL    B
2809  99F9 48                  ASL    A
2810  99FA 59                  ROL    B
2811  99FB D7 B3               STA    B     W2J1
2812  99FD 97 B4               STA    A     W3J1
2813  99FF 48                  ASL    A                ROW*8
2814  9A00 59                  ROL    B
2815  9A01 9B B4               ADD    A     W3J1
2816  9A03 D9 B3               ADC    B     W2J1      ROW*24
2817  9A05 8B 17               ADD    A     #23       ADD LENGTH TO GET END ADDR FOR ROW
2818  9A07 09 B2               ADC    B     W1J1      ADD BASE ADDR
2819  9A09 D7 B3               STA    B     W2J1
2820  9A0B 97 B4               STA    A     W3J1
2821  9A0D 9E B3               LDS          W2J1
2822  9A0F 86 08               LDA    A     #8        # OF WD TRIOS IN ROW
2823  9A11 97 B3               STA    A     W2J1
2824  9A13 09       BIU010     DEX
2825  9A14 A6 25               LDA    A     $25,X     GET LS 2 BITS OF EACH
2826  9A16 0D                  SEC                    INSERT MARK BIT
2827  9A17 49                  ROL    A
2828  9A18 48                  ASL    A
2829  9A19 48                  ASL    A
2830  9A1A 09       BIU020     DEX                    BUILD NEXT WORD OF TRIO
2831  9A1B E6 25               LDA    B     $25,X
2832  9A1D 59                  ROL    B
2833  9A1E 48                  ASL    A
2834  9A1F 59                  ROL    B
2835  9A20 37                  PSH    B               SAVE AT CORRECT ADDRESS
2836  9A21 48                  ASL    A
2837  9A22 26 F6               BNE          BIU020    MORE OF TRIO?
2838  9A24 7A 00B3             DEC          W2J1
2839  9A27 26 EA               BNE          BIU010    MORE IN ROW?
2840  9A29 9E 0103             LDS          #TESTK0-2 RESTORE SP
2841  9A2C 39                  RTS
2842                  *
2843            9A2D WR        EQU    *
2844            849C           ORG    WP
M6800 ASSEMBLER       V004              FOR 2F FRONT-END SEGMENT 3/19/76
1539            819E WP        EQU    *
1540            98B2           ORG    WR
1541                  *
1542                  *        SFNCR
1543                  *        -----
1544                  *SEND NEW CAPTURE REGISTERS
1545                  * CALLED FROM JFNCR3 & XISTRT TO DO
1546                  * ACTUAL SENDING OF CR'S.
1547                  *
1548                  *SEND NEW CR'S
1549  98B2 CE 0033 SFNCR       LDX          $DFCRW    ADDR. OF 1ST CR
1550  98B5 86 40               LDA    A     #$40      B. 5 LEADS IN TIME
1551  98B7 DF BA   BFN1A       STX          W1J3      SAVE ADDR. OF NEXT CR WORDS
1552  98B9 C6 01   BFN1        LDA    B     #1        7-BIT MARKER
1553  98BB 44                  LSR    A               SELECT NEXT BIT OF EACH CR
1554  98BC 26 02               BNE          BFN010    BITS 0-5?
1555  98BE 8B 40               ADD    A     #$40      SELECT B. 6, CLEAR C
1556  98C0 DE BA   BFN010      LDX          W1J3      NEXT CR WD ADDRESS (ALPHA 1)
```

```
1557 98C2 A5 00      BFN020   BIT   A   X
1558 98C4 27 01               BEQ       BFN030
1559 98C6 OD                  SEC                           SET C = BIT
1560 98C7 08         BFN030   INX                           NEXT CR ADDRESS
1561 98C8 59                  ROL   B                       SHIFT C INTO BITS SO FAR
1562 98C9 24 F7               BCC       BFN020              MARKER BIT NOT SHIFTED OUT?
1563 98CB F7 1202             STA   B   PFNCR               PULSE 1 BIT FOR EACH CR
1564 98CE 81 40               CMP   A   #$40
1565 98D0 26 E7               BNE       BFN1                NOT 71H, 14TH ETC. BIT?
1566 98D2 09                  DEX
1567 98D3 8C 005D             CPX       #DFCRA+35
1568 98D6 26 DF               BNE       BFN1A               NOT ALL DONE?
1569                 *TERMINATE CR RAM
1570 98D8 96 3A              LDA   A   DFCRA
1571 98DA 84 80              AND   A   $FFSAC              SET STOCK/ALPHA MARKER
1572 98DC 8B 20              ADD   A   #FIOFE
1573 98DE B7 1400            STA   A   PFCCR               SET "MARK" BIT
1574 98E1 F7 1202            STA   B   PFNCR               CLOCK MARK (=FINAL) BIT
1575 98E4 8B 40              ADD   A   #FFCCR
1576                 *INITIALISE CR RAM FOR NEXT TIME
1577 98E6 C6 3F              LDA   B   $FFNCRH             PULSE COUNTER CLEAR
1578 98E8 F7 1401            STA   B   PFNCRI              (HI & LO)
1579 98EB C6 37              LDA   B   #FFNCRL
1580 98ED F7 1401            STA   B   PFNCRI
1581 98F0 B7 1400            STA   A   PFCCR               CR XFER STARTED HERE
1582 98F3 39                 RTS
1583                 *
1584         98F4 WR          EQU       *
1585         819E             ORG       WP

M6800 ASSEMBLER     V004         IOR 2P PIA DEFINITION 3/12/76

842                            NAM   IOR 2P PIA DEFINITION 3/12/76
843                 *
844                 *PIA/ACIA DEFINITION
845                 *--------------------
846                 *--------------------
847                 *
848                 * PIA/ACIA ADDRESSES ARE CURRENTLY ALLOCATED AS FOLLOWS:-
849                 *        B. 0/1 = REG. SELECT
850                 *        B. 12/15 = MEMORY SEGMENT (0 FOR I/O)
851                 *        B. 9/11 = PIA SELECT (MUST NOT BE 0 OR
852                 *                 ACCESSING RAM OFFF MAY CAUSE PIA READ)
853                 * THIS ALLOWS 7 PIA'S TO BE UNIQUELY ADDRESSED
854                 * 2P USES 1200 FOR TICKERS AND FRONT-END (NEW CAPTURE REGS)
855                 *          1400 FOR FRONT-END, VIDEO (ROW LENGTHS) &
856                 *               INITIALISATION (DISABLE FRONT-END)
857                 *          1600 FOR VIDEO (CHARS/ADDRESS), FRONT-END (DMA ADDR
858                 *               EXEC (PRTY ERR) & INITIALISATION (LONG INIT)
859                 *          1800 FOR WIRE SERVICE PRINTER, KBD (HORN, LIGHTS
860                 *               & STROBE) & EXECUTIVE (TIMER)
861                 *          1A00 FOR PROCESSOR CONTROLLED PORT
862                 *          1C00 FOR KBD AND MAIN PRINTER
863                 *
864                 *
865                 *
866                 * TICKERS
867                 * -------
868         1200 PTKR           EQU   $1200               TICKER CHAR (6) & ERR (B.7)(R)
869                 *                                    & TICKER SELECT (B.6)(W)
870         0040 FTKRB          EQU   $40                 B. 6=0 FOR NYSE, =1 FOR AMEX
871         0040 FTKRD          EQU   $40                 DDR - TKR, TKR ERR I/P, TKR SLCT O/
872         1201 PTKRC          EQU   PTKR+1              CA1X=TKR RDY CA2X=TKR RCV
873         0024 FTKRC          EQU   %100100             TKR RDY LO = FLAG (NO IRQ YET)
874                 *                                    TKR RCV GOES LO ON PTKR R
875         0025 FTKRCY         EQU   %100101             WHEN TICKER REQD, FLAG = IRQ
876                 *
877                 *
878                 * VIDEO
879                 * -----
880         1600 PVID           EQU   $1600               VID CHAR/ADDR (7)(W & R)
881                 *                                    & CHAR/ADDR SELECT (B7)(W & R WITH B
882         0080 FVIDCH         EQU   $80                 B. 7=0 FOR ADDR, =1 FOR CHAR
883         00FF FVIDD          EQU   $FF                 DDR - ALL O/P
```

```
884      1601 PVIDC    EQU    PVID+1      CA1X = VID RDY CA2X = VID CLK
885      002C FVIDC    EQU    %101100     VID RDY LO = FLAG (NO IRQ YET)
886           *                            VID CLK PULSED LO ON PVID R
887      002D FVIDCY   EQU    %101101     WHEN DRIVER SETS DATA, FLAG = IRQ
888           *
889      1402 PVRWL    EQU    $1402       VID RWL (W+IR TO CLEAR PVRWLC FLAG)
890      0001 FVRWLD   EQU    $01         DDR = RWL O/P, CTO-6 I/P (SEE P-E)
891      1403 PVRWLC   EQU    PVRWL+1     CA1X=VSYNC CA2X = RWL CLK
892      002C FVRWLC   EQU    %101100     VSYNC LO = FLAG (NO IRQ YET)
893           *                            RWL CLK PULSED LO ON PVRWL W
894      002D FVRLCY   EQU    %101101     WHEN RWL'S TO GO, R PVRWL & FLAG =
895           *
896           *
897           * WIRE SERVICE PRINTER
898           * ------------------
899      1800 PWSP     EQU    $1800       WIRE PRINTER CHAR (7) (W&R)
900      00FF FWSPD    EQU    $FF         DDR = ALL O/P (1 SPARE)
901      1801 PWSPC    EQU    PWSP+1      CA1X = WSP RDY CA2X = WSP XMIT
902      0024 FWSPC    EQU    %100100     WSP RDY LO = FLAG (NO IRQ YET)
903           *                            WSP XMIT GOES LO ON PWSP R
904      0025 FWSPCY   EQU    %100101     WHEN PRTR REQD, FLAG = IRQ
905           *
906           *
907           * PROCESSOR CONTROLLED PORT
908           * ------------------
909      1A00 PUCPI    EQU    $1A00       PCP INPUT (8)(R)
910      0000 FUCPID   EQU    $00         DDR = ALL I/P
911      1A01 PUCPIC   EQU    PUCPI+1     CA1X=NEW I/P DATA CA2X=I/P DATA RE
912      0024 FUCPIC   EQU    %100100     NEW DATA LO = FLAG
913           *                            DATA READ LO ON PUCPI R
914      0025 FUCPIY   EQU    %100101     WHEN PCP I/P EXPECTED, FLAG = IRQ
915      1A02 PUCPO    EQU    PUCPI+2     PCP OUTPUT (8)(R&W)
916      00FF FUCPOD   EQU    $FF         DDR = ALL O/P
917      1A03 PUCPOC   EQU    PUCPO+1     CA1X=O/P DATA READ CA2X=NEW O/P DA
918      0024 FUCPOC   EQU    %100100     DATA READ LO = FLAG (R PUCPO TO CL
919           *                            NEW DATA LO ON PUCPO W
920      0025 FUCPOY   EQU    %100101     WHEN PCP O/P REQD, FLAG = IRQ
921           *
922           *
923           * KEYBOARD
924           * --------
925      1802 PKBDHL   EQU    PWSP+2      -KBD HRN, LIGHT (2)(R&W) & STROBE (1
926           *                            R, CHANGE B)1,W: SO MUST BE PIA 'B' S]
927      0001 FKBDH    EQU    $01         B. 0 = HORN
928      0002 FKBDLE   EQU    $02         B. 1 = 'ENABLE 2' LIGHT
929      0080 FKBDST   EQU    $80         B. 7 = STROBE (R)
930      0003 FKBDHD   EQU    $03         DDR = H&L O/P, STROBE I/P (5 SPARE)
931           *
932      1C00 PKBD     EQU    $1C00       KBD CHAR (7)(R)
933      0080 FKBDD    EQU    $80         DDR = I/P (1 SPARE)
934      1C01 PKBDC    EQU    PKBD+1      CA1 = KBD STROBE CA2 SPARE
935      0007 FKBDC    EQU    %000111     KBD STROBE HI = IRQ
936           *
937           *
938           *
939           *
940           * MAIN PRINTER
941           * ------------
942      1C02 PPRT     EQU    PKBD+2      PRINTER CHAR (7)(R&W)
943      00FF FPRTD    EQU    $FF         DDR = ALL O/P (1 SPARE)
944      1C03 PPRTC    EQU    PPRT+1      CA1X = PRT RDY CA2X = PRT XMIT
945      0024 FPRTC    EQU    %100100     PRT RDY LO = FLAG (NO IRQ YET)
946           *                            PRT XMIT GOES LO ON PPRT W
947      0025 FPRTCY   EQU    %100101     WHEN PRINTER REQD, FLAG = IRQ
948           *
949           *
950           * FRONT-END
951           * ---------
952      1202 PFNCR    EQU    PTKR+2      NEW CAPTURE REGS (8)(W)
953      00FF FFNCRD   EQU    $FF         DDR = O/P
954      1203 PFNCRC   EQU    PFNCR+1     CA2X = NCR CLK CA1 SPARE
955      002C FFNCRC   EQU    %101100     NCR CLK PULSED LO ON PFNCR W
956           *
```

```
957         1402 FFCIA    EQU    PVRWL     CAPTURE TYPES 0-6 (R)
958              *
959         1400 FFCIB    EQU    FFCIA-2   CAPTURE TYPES 7-10 (R)
960         1400 FFCCR    EQU    PFCTB     CHANGE CAPTURE REGS (W)
961         0040 FFCCR    EQU    $40       CCR = B.6X (PULSE LOW > NCR CLK PUL
962         1400 FFSAC    EQU    FFCTB     STOCK/ALPHA COMPARISON (W)
963         0080 FFSAC    EQU    $80       SAC = B.7 = 1 = > STOCK
964         00F0 FFCTBU   EQU    $F0       ODR = CT I/P, SAC, CCR,
965              *                         DFE (SEE INIT) O/P, 1 SPARE
966         1401 FFFKT    EQU    FFCTB+1   -CA1 = PKT CAPTURED, CA2 SEE BELOW
967         0037 FFFKTC   EQU    %110111   PKT HI = IRQ
968         1401 FFNCRT   EQU    FFFKT     CA1 SEE ABOVE, CA2 = NCR INIT
969         0037 FFNCRL   EQU    FFFKTC    NORMALLY NCRI LOW
970         003F FFNCRH   EQU    %111111   PULSED HI BEFORE SENDING NCR'S
971              *
972         1602 PFDMA    EQU    PVID+2    NEW DMA ADDRESS (6)(W)
973         003F FFDMAD   EQU    $3F       DDR=DMA O/P, INIT I/P(SEE INIT), 1 SP
974         1603 PFDMAC   EQU    PFDMA+1   CA2X = DMA CLK, CA1 SEE MEMORY
975         002F FFDMAC   EQU    %101111   DMA CLK PULSED LO ON PFDMA W
976              *                         PRTY HI = IRQ (SEE MEMORY)
977              *
978              *
979              * EXECUTIVE
980              * ---------
981         1603 PEPRTY   EQU    PFDMAC    CA1 = PRTY ERROR, CA2 SEE FRONT-END
982         1602 PEPDUM   EQU    PEPRTY-1  DUMMY R TO CLEAR FLAG
983         1803 PETMR    EQU    PKBDHL+1  CA1X = VSYNC CA2 SPARE
984         0005 PETMRC   EQU    %000101   VSYNC LO = IRQ
985         1802 PETDUM   EQU    PETMR-1   DUMMY R TO CLEAR FLAG
986              *
987              *
988              * INITIALISATION
989              * --------------
990         1602 PINIT    EQU    PFDMA     LONG INIT (R)
991         1400 FIDFE    EQU    PFCTB     DISABLE FRONT-END (W)
992         0020 FIDFE    EQU    $20       DFE = B.5X
993              *
994              *
```

Figure 5:
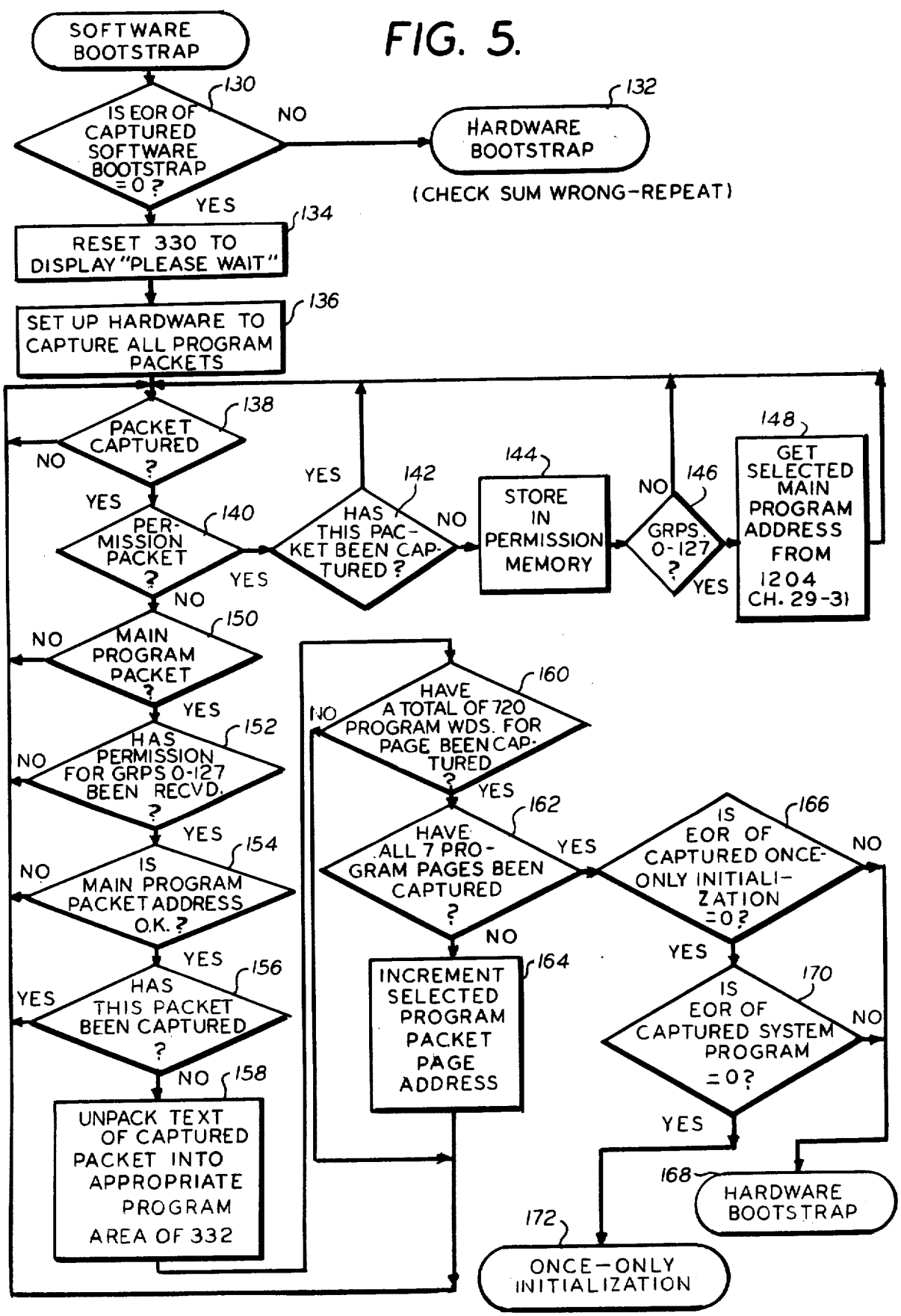
FIG. 5 is a logic flow diagram of the preferred software bootstrap program for use in the system of the present invention.

Referring now to FIG. 5, as previously mentioned, a logic flow diagram of the preferred software bootstrap program which was previously loaded into the memory 332 in a data portion thereof by the microprocessor 310 under control of the hardware bootstrap program previously described with reference to FIG. 4, is shown. It should be noted that the symbol EOR utilized in FIG. 5 refers to the aforementioned exclusive OR function relating to the check sum. The system logic now determined whether or not the software bootstrap has been correctly loaded by looking at the check sum thereof which, as previously mentioned, is an exclusive OR (EOR) of all of the preceding words contained in the software bootstrap program. Preferably, by way of example, the exclusive OR of this check sum and all of the preceding words contained in the software bootstrap program should be equal to zero if the software bootstrap program has been correctly loaded. If this exclusive OR is not equal to zero, then the check sum is incorrect and indicates to the system logic, namely microprocessor 310, that the software bootstrap has not been correctly loaded and the system 300 must once again return control of the microprocessor 310 to the hardware bootstrap program for reloading of the software bootstrap program in accordance with the manner previously described with reference to FIG. 4. This function is repeated in FIG. 5 by decision symbol 130 and symbol 132. However, assuming that this check sum is correct and, accordingly, that the software bootstrap program has been correctly loaded, then the microprocessor 310 in accordance with the software bootstrap program resets the CRT 330 to preferably display the message "PLEASE WAIT" as represented by symbol 134. While this message is being displayed, the microprocessor 310 under control of the software bootstrap program preferably sets up the system logic to capture all program packets which are transmitted, that is all packets or rows 1202 having a special character, by way of example, of 33 in the 5 th character position, which thereby identifies that the particular packet is a program packet. This function is represented by symbol 136 in FIG. 5.

Preferably, permission packets 1204 are always captured by the system logic. Since transmitted permission packets are always captured by the logic, the previously mentioned function 116 of the system under control of the aforementioned hardware bootstrap (FIG. 4) is required so that the system can identify that the captured packet belongs to the software bootstrap program and not to permission. The system logic under control of the software bootstrap program, then determines whether or not a packet has been captured. This function is represented by decision symbol 138 in FIG. 5. As previously mentioned, this captured packet could be a permission packet 1204 or could be any program packet 1202. If a packet has not been captured, then an iterative control loop is formed until a packet is captured by the logic. However, when a packet has been captured, the system logic then determines whether or not this captured packet is a permission packet 1209, this function being represented by decision symbol 140. If the captured packet is a permission packet, then the logic must determine whether or not this permission packet 1204 has been previously captured, this function being represented by decision symbol 142, since the permission packets are preferably cyclically continuously transmitted, as is preferably true of all packets in the system of the present invention, and, once again, through an error of transmission or some other reason, the particular permission packet 1204 may or may not have been previously captured by the terminal 300. If the terminal 300 has already captured this permission packet 1204, then an iterative control loop is formed, until a permission packet 1204 is captured which has not been previously captured. If the permission packet 1204, however, has not been previously captured, then the terminal 300 preferably stores this permission packet in permission memory, this function being represented by symbol 144 in FIG. 5. When this permision packet 1204 is stored in permission memory, the logic then determines whether or not, in the example given, the captured permission packet pertains to groups zero through 127, this function being represented by decision symbol 146, since, as previously described with reference to FIG. 3, groups zero through 127 are the groups preferably identified with the permision message for the program grabbing function of the terminal 300. If the group or groups associated with the permission packet are not groups zero through 127, in other words if the 4th character of the permission packet 1204 as represented by FIG. 3 is not, by way of example, the number 32, then an iterative control loop is formed until a permission packet 1204 is captured which relates to the aforementioned groups zero through 127. When the system logic captures a permission packet 1204 identified with the aforementioned groups zero through 127, then the micro-processor 310 under control of the software bootstrap program obtains the selected program address from the information contained in characters 20 through 31, by way of example of the permission packet 1204 of FIG. 3 which characters, as previously mentioned, preferably contain the program page number of the first program page of the selected downstream program to be captured. This function is represented by symbol 148. When this has been accomplished, an iterative loop is formed so as to enable the logic to now continue on to the next operation which involves actual capture of the specific selected main program. Assuming that the packet which has been captured is not a permission packet, the logic then determines whether or not this captured packet is a main program packet 1202, this function being represented by symbol 150 in FIG. 5. If the captured packet is not a permission packet 1204 and is not a main program packet 1202, then an iterative control loop is formed until a main program packet 1202 is captured. When this occurs, that is when a main program packet 1202 is captured, the logic then determines whether or not permission has been received for the aforementioned groups zero through 127 which indicates to the logic that the terminal 300 has permission to capture a downstream main program. This function is represented by decision symbol 152. If permission has not been received for the capture of the selected main program, then an iterative control loop is formed until a proper permission packet 1204 is received and captured by the terminal 300, as functionally represented by symbols 140-142-144-146-148 in FIG. 5. Assuming that proper permission has been received, and a program packet 1202 has been captured, the logic then determines whether or not the address of the captured main program packet 1202 is correct in accordance with the selected program address which was previously obtained from information contained in characters 29 through 31 of the aforementioned captured permission packet. If the address of the captured program packet is not correct, then an iterative control loop is formed until the address of a captured main program packet 1202 is correct, that is, matches the selected program address, this function being represented by decision symbol 154 in FIG. 5. When the address of the captured main program packet 1202 is correct, the logic then determines whether or not it has previously captured that particular main or control program packet 1202 since, once again, as previously mentioned, these main program packets 1202 are also preferably cyclically continuously retransmitted in the system of the present invention and through some error in transmission, or for some other reason, the logic may have previously captured that particular main program packet 1202. This function is represented by decision symbol 156 in FIG. 5. If that particular main program packet 1202 has been previously captured, an iterative control loop is formed until the logic captures a correct main program packet 1202, that is one corresponding to the selected downstream program, which has not been previously captured. When this occurs, the logic then packs or loads the text of this main program packet 1202 which, as previously mentioned, contains the 24 program words, by way of example, contained in characters 6 through 37 (FIG. 2), into the appropriate area of the program memory 332, as previously described. This function is represented by symbol 158 in FIG. 5. After the captured main program packet has been loaded into the appropriate program of memory 332, the logic then determines whether or not the 720 program words associated with the program page which the particular captured main program packet forms a portion of has been captured, there preferably being 30 such program packets per program page, as previously mentioned. This function is represented by decision symbol 160 in FIG. 5. If the entire 720 program words associated with the particular program page with which the captured program packet is associated have not been captured, then an iterative control loop is formed until these entire 720 program words associated with that program page have been captured. When this occurs, the logic then determines whether or not all of the aforementioned 7 consecutively numbered program pages associated with the correct, that is selected, main program have been captured, this function being represented by decision symbol 162 in FIG. 5. If all 7 of these program pages have not been captured, then the logic preferably increments the selected program packet address by one and an iterative control loop is formed with the aforementioned logic iteratively functioning as above, until all 7 consecutively numbered program pages have been captured, the logic incrementing the selected program packet address by one after capture of each program page has been accomplished. This function is represented by symbol 164 in FIG. 5. The logic, of course, incrementing by one because of the previously mentioned containment of the main program in 7 consecutively numbered program pages. After all of these 7 consecutively numbered program pages have been captured, then the logic preferably checks the last word of the once-only initialization page portion of the captured selected main program by exclusively ORing all of the preceding words associated with this first program page once-only initialization program portion with the check sum portion of this first program page to determine if this exclusive OR is a zero. If it is a zero, this indicates to the logic that the once-only initialization portion of the main program has been correctly loaded. However, if the once-only initialization program portion has not been correctly loaded, this function being represented by decision symbol 166 in FIG. 5, then control of the microprocessor 310 is preferably returned to the aforementioned hardware bootstrap program (FIG. 4), with microprocessor 310 then, once again, reloading the software bootstrap program under control of the aforementioned hardware bootstrap program. This function is represented by symbol 168 of FIG. 5. If, however, the once-only initialization program has been correctly loaded and, accordingly, the aforementioned exclusive OR is zero, then the logic determines whether or not the main system program contained in the subsequent 6 consecutively numbered program pages has been correctly loaded by, similarly, exclusively ORing all of the preceding words of these 6 program pages with the last word of the 6 program pages which is the check sum. If this exclusive OR is not a zero, it indicates to the logic that the system program has not been correctly loaded and, as mentioned above, control of the microprocessor 310 is then preferably returned to the aforementioned hardware bootstrap program, with microprocessor 310 then functioning, once again, under control thereof to reload the software bootstrap and then, subsequently, to reload the entire main program, this function being represented by symbol 168 in FIG. 5. If, however, the system program has been correctly loaded as indicated by the aforementioned exclusive OR being zero, then control of the microprocessor 310 is turned over to the captured once-only initialization program portion of the main program, as functionally represented by symbol 172 in FIG. 5, decision symbol 170 functionally representing the correct loading of the system program. A typical program listing for the aforementioned bootstrap program is provided below, the program listing also being written in M6800 assembler language for use with a Motorola M6800 computer 310, as was the previously provided hardware bootstrap program, the symbols thereof being the conventional symbols associated with M6800 assembler language for use with a Motorola M6800 computer.

```
M6800 ASSEMBLER    V004         JDR 2F INITIALISATION SEGMENT 3/22/76

2128         8478      WP      EQU     *
 2129         0800              ORG     $800
 2130                    *
 2131                    *      XIBOOT
 2132                    *      ------
 2133                    *SOFTWARE BOOTSTRAP
 2134                    *BOOTED INTO $800->$ACE BY H/W BOOT
 2135                    *        CHECKS ITS CHECKSUM
 2136                    *        RESETS VIDEO WITH "WAIT" MESSAGE
 2137                    *        BOOTS IN PERMISSION MESSAGES
 2138                    *        BOOTS IN REQD 4K PROGRAM TO $8000->
 2139                    *        BOOTS IN REQD ONCE ONLY INIT (720 WDS) TO $D00->
 2140                    *        CHECKS BOTH CHECKSUMS
 2141                    *        CLEARS RAM TO $7FF (EXCEPT VID MEM/PERM PTRS)
 2142                    *        ENTERS ONCE ONLY INITIALISATION
 2143                    *
 2144                    *START POINT
 2145  0800  20 0D       XIBOOT  BRA     BIBOO5
 2146                    *SCREEN MESSAGE WHILE WAITING
 2147                    * (MUST START & END WITH SPACE & NOT CROSS 256-WD BNDRY)
 2148                            OPT     NOG
 2149  0802  20          IIMSG   FCC     / PLEASE WAIT /
 2150        0008        WISIZ   EQU     *-IIMSG-2
 2151        0237        WICH1   EQU     WISIZ-2972+576
 2152        0228        WICH2   EQU     WICH1-WISIZ-1
 2153                    *CHECK S/W BOOT
 2154  080F  CE 0800     BIBOO5  LDX     #$800       START ADDRESS
 2155  0812  86 2D               LDA  A  #45.        SIZE/16
 2156  0814  BD 094E             JSR     LCCSUM      RETURNS IF GOOD
 2157                    *INIT VIDEO
 2158  0817  CE FF20             LDX     #FVIDO*256+FVIDCY
 2159  081A  FF 1600             STX     FVID        SET VIDEO PIA
 2160  081D  86 1402             LDA  A  PVRWL       CLEAR VSYNC FLAG
 2161  0820  B6 1403     BIBO10  LDA  A  PVRWLC      WAIT FOR VSYNC
 2162  0823  2A FB               BPL     BIBO10
 2163  0825  86 01               LDA  A  #1
 2164  0827  C6 10               LDA  B  #16
 2165  0829  B7 1402     BIBO20  STA  A  PVRWL       SEND RWL'S (ALL 32-CHARS)
 2166  082C  5A                  DEC  B
 2167  082D  2F FA               BGT     BIBO20
 2168  082F  CE 0400             LDX     #1024       RESET SCREEN:
 2169  0832  86 7F               LDA  A  #$7F
 2170  0834  B7 1600             STA  A  PVID        SCREEN ADDRESS -> 0
 2171  0837  B6 1600             LDA  A  PVID
 2172  083A  4F          BIBO30  CLR  A
 2173  083B  8C 0237             CPX     #WICH1      START WITH SPACES
 2174  083E  27 07               BEQ     BIBO40      INSERT MESSAGE
 2175  0840  8C 022B             CPX     #WICH2
 2176  0843  26 05               BNE     BIBO50
 2177  0845  86 03               LDA  A  #3          END WITH SPACES
```

```
2178 0847 B7 084E  B1B040    STA  A  W1B070
2179 084A B6 0802  B1B050    LDA  A  TIMSG         GET CHARACTER
2180           084C W1B060   EQU     *-1
2181 084D 20 03              BRA     B1B080
2182           084E W1B070   EQU     *-1
2183 084F 7C 084C             INC     W1B060        UPDATE POINTER IF NECESSARY
2184 0852 8A 80    B1B080    ORA  A  #$V1DCH
2185 0854 B7 1600            STA  A  PVID
2186 0857 B6 1600            LDA  A  PVID          SEND CHAR
2187 085A B6 1601  B1B090    LDA  A  PVIDC
2188 085D 2A FB              BPL     B1B090        WAIT FOR VID RDY
2189 085F 09                 DEX
2190 0860 26 D8              BNE     B1B030        MORE?
2191           *BOOT IN PROGRAM & PERMISSIONS
2192 0862 86 06              LDA  A  #6            PROGRAM PAGE COUNT - 1
2193 0864 97 C9              STA  A  W4I
2194 0866 7F 00B5            CLR     W1J2          INITIAL UNPACK "ROW"
2195 0869 86 07              LDA  A  #7
2196 086B 97 50              STA  A  DFPKTN        DMA ADDRESS
2197 086D 86 7F              LDA  A  #$7F
2198 086F 97 62              STA  A  DKGP          DEFAULT PROGRAM ADDRESS
2199 0871 97 63              STA  A  DKGP+1
2200 0873 4A                 DEC  A
2201 0874 97 64              STA  A  DKGP+2
2202 0876 C6 0D              LDA  B  #$D           ONCE-ONLY INIT FIRST
2203 0878 86 1E    B1B110    LDA  A  #30           # PROGRAM PACKETS PER PAGE
2204 087A 97 C8    B1B115    STA  A  W3I
2205 087C D7 B2              STA  B  W1J1          88-15 UNPACK ADDRESS
2206 087E 7C 0064            INC     DKGP+2        GET NEXT PROGRAM PAGE
2207 0881 96 C9              LDA  A  W4I           UPDATE UNPACK "ROW":
2208 0883 81 04              CMP  A  #4
2209 0885 22 06              BHI     B1B116        1ST PAGE OF PROGRAM?
2210 0887 D6 B5              LDA  B  W1J2
2211 0889 CB 1E              ADD  B  #30
2212 088B D7 B5              STA  B  W1J2
2213 088D C6 FF    B1B116    LDA  B  #-1           RESET FLAG WORDS
2214 088F CE 0020            LDX     #$20
2215 0892 09       B1B117    DEX
2216 0893 E7 00              STA  B  X
2217 0895 DF 83              STX     W2J1
2218 0897 26 F9              BNE     B1B117
2219 0899 96 50    B1B120    LDA  A  DFPKTN
2220 089B BD 9826            JSR     SEGABD        GET PKT ADDRESS
2221 089E B7 1602  B1B130    STA  A  PFDMA         SEND DMA ADDRESS
2222 08A1 F6 1401  B1B140    LDA  B  PFPKT         WAIT FOR CAPTURE
2223 08A4 2A FB              BPL     B1B140
2224 08A6 F6 1400            LDA  B  PFCTB         CLEAR PKT FLAG
2225 08A9 F6 1402            LDA  B  PFCTA
2226 08AC C5 88              BIT  B  #$88
2227 08AE 2E 2C              BGT     B1B180        PROGRAM PACKET?
2228 08B0 27 EC              BEQ     B1B130        UNREQUIRED PACKET?
2229           *PROCESS PERMISSION PACKET
2230 08B2 E6 03              LDA  B  3,X           GET ROW
2231 08B4 C4 1D              AND  B  #@35
2232 08B6 54                 LSR  B
2233 08B7 24 02              BCC     B1B150
2234 08B9 CA 10              ORA  B  #@20
2235 08BB CA 40    B1B150    ORA  B  #@100
2236 08BD 54                 LSR  B
2237 08BE F7 08C6            STA  B  W1B160
2238 08C1 F7 08CA            STA  B  W1B170
2239 08C4 7D 0020            TST     $20
2240           08C6 W1B160   EQU     *-1
2241 08C7 26 05              BNE     B1B130        ALREADY GOT?
2242 08C9 97 20              STA  A  $20           SET PERMISSION MEMORY POINTER
2243           08CA W1B170   EQU     *-1
2244 08CB 7C 0050            INC     DFPKTN        GET NEXT BUFFER
2245 08CE C1 20              CMP  B  #@40
2246 08D0 26 C7              BNE     B1B120        NOT GROUPS 0-127?
2247 08D2 A6 1C              LDA  A  28,X          GET PROGRAM ADDRESS
2248 08D4 97 62              STA  A  DKGP
2249 08D6 EE 1D              LDX     29,X
2250 08D8 DF 63              STX     DKGP+1
```

```
2251 08DA 20 BD              BRA     BIB120
2252              *PROCESS PROGRAM PACKET
2253 08DC D6 64   BIB180 LDA B DKGP+2
2254 08DE E1 02          CMP B 2,X
2255 08E0 26 BC          BNE   BIB130         NOT CORRECT PROGRAM PAGE?
2256 08E2 D6 62          LDA B DKGP
2257 08E4 E1 00          CMP B X
2258 08E6 26 B6          BNE   BIB130         NOT CORRECT PROGRAM?
2259 08E8 D6 63          LDA B DKGP+1
2260 08EA E1 01          CMP B 1,X
2261 08EC 26 B0          BNE   BIB130         DITTO?
2262 08EE A6 03          LDA A 3,X            GET ROW
2263 08F0 81 1D          CMP A #29
2264 08F2 22 AA          BHI   BIB130         BAD PACKET?
2265 08F4 B7 08F9        STA A WIB195
2266 08F7 7C 0000        INC   0
2267      08F9 WIB195    EQU   *-1
2268 08FA 26 9D          BNE   BIB120         ALREADY GOT?
2269 08FC 9B B5          ADD A WIJ2
2270 08FE BD 99F4        JSR   SIUNPK         UNPACK 24 PROGRAM WORDS
2271 0901 7A 00C8        DEC   W3I
2272 0904 26 93          BNE   BIB120         GET NEXT PROGRAM PACKET
2273 0906 C6 80          LDA B #$80           ALL GOT IN THIS PAGE:
2274 0908 86 15          LDA A B21            GET NEXT PAGE
2275 090A 7A 00C9        DEC   W4I
2276 090D 26 03          BNE   BIB197
2277 090F 7E 087A        JMP   BIB115         LAST PAGE
2278 0912 2D 03   BIB197 BLT   BIB200
2279 0914 7E 0878        JMP   BIB110         MORE PAGES
2280              *SET REST OF PERMISSION MESSAGES
2281 0917 6F 20   BIB200 CLR   $20,X          CLEAR REST OF BUFFERS
2282 0919 08             INX
2283 091A 8C 07E0        CPX   #$7E0
2284 091D 26 F8          BNE   BIB200
2285 091F CE 0020        LDX   #$20
2286 0922 96 50          LDA A DFPKTN
2287 0924 81 17   BIB210 CMP A #23
2288 0926 2C 0A          BGE   BIB230
2289 0928 6D 00          TST   X
2290 092A 26 03          BNE   BIB220
2291 092C A7 00          STA A X              SET UNCAPTURED PERMISSION
2292 092E 4C             INC A
2293 092F 08     BIB220  INX
2294 0930 20 F2          BRA   BIB210
2295              *CHECK PROGRAM CHECKSUMS
2296 0932 CE 0D00 BIB230 LDX   #$D00
2297 0935 86 2D          LDA A #45
2298 0937 8D 15          BSR   LICSUM         CHECK ONCE-ONLY INIT
2299 0939 CE 8000        LDX   #$8000
2300 093C 4F             CLR A
2301 093D 8D 0F          BSR   LICSUM         CHECK MAIN PROGRAM
2302 093F CE 8F4C        LDX   #IESCAN        **FOR EXORCISOR ONLY
2303 0942 FF FFF8        STX   $FFF8          **       "
2304 0945 FE FFFA        LDX   $FFFA          **       "
2305 0948 FF FFFC        STX   $FFFC          **FOR EXORCISOR ONLY
2306 094B 7E 0DA0        JMP   XINIT          ENTER ONCE-ONLY INITIALISATION
2307              *LOCAL S/R TO CHECK CHECKSUM:
2308              *IX = PROGRAM S.A., ACC = PROG SIZE/16
2309 094E 5F     LICSUM  CLR B                CSUM
2310 094F 36     BIC010  PSH A
2311 0950 86 10          LDA A #16            CT
2312 0952 E8 00  BIC020  EOR B X              GET CSUM
2313 0954 08             INX
2314 0955 4A             DEC A
2315 0956 2E FA          BGT   BIC020
2316 0958 32             PUL A
2317 0959 4A             DEC A
2318 095A 2E F3          BGT   BIC010
2319 095C 5D             TST B
2320 095D 26 01          BNE   BIC030
2321 095F 39             RTS                  GOOD CSUM
2322 0960 7E 9967 BIC030 JMP   XISTRT         BAD CSUM - REBOOT
2323              *
2324      8478           ORG   WP
```

Figure 6:
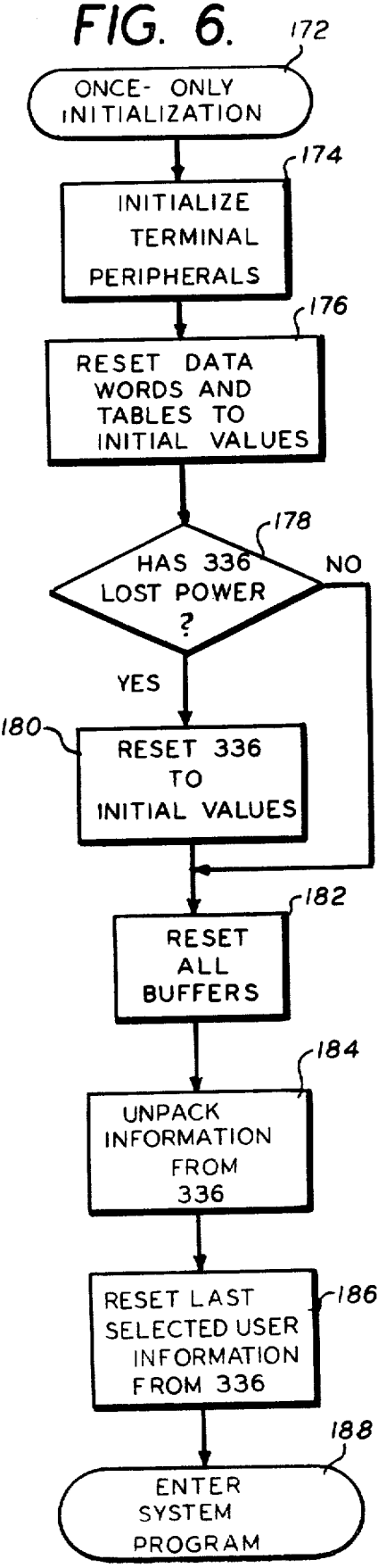
FIG. 6 is a logic flow diagram of the preferred once-only initialization program for use in the system of the present invention.

Now referring to FIG. 6, a logic flow diagram associated with the aforementioned once-only initialization program portion of the main program is shown. As previously mentioned with respect to FIG. 5, microprocessor 310 under control of the software bootstrap program has control thereof turned over to the once-only initialization program after the correct loading of the selected main program, as functionally represented by symbol 172 in FIG. 6. It should also be noted, as previously mentioned, that this once-only initialization program portion of the main program is preferably written in a portion of memory 332 which is normally assigned to data so that this once-only initialization program is subsequently overwritten by data during the normal operation of the terminal 300 in accordance with the selected loaded system program. Under control of the once-only initialization program, the logic is directed to initialize the associated terminal 300 peripherals such as tickers 322, printers 316-318-320, keyboard 324, the computer interface 312-314, etc., this function being represented by symbol 174 in FIG. 6. After this initialization has been accomplished, the logic then resets the data words and tables of the main memory 332 to their initial values, which function is represented by symbol 176 in FIG. 6. As will be described in greater detail hereinafter, preferably certain portions of the random access memory (RAM) 336 are conventionally protected against loss of information when power is lost, this function being referred to as "power failure-protected random access memory." Thus, the logic preferably now determines whether or not this power failure-protected random access memory portion 336 has lost power, which function is represented by decision symbol 178 in FIG. 6. If this portion 336 has lost power, then the logic resets this memory portion 336 to its initial values, as functionally represented by symbol 180 in FIG. 6. If, however, this portion 336 has not lost power, then the logic immediately loops to the next functional step which is the resetting of all buffers located in the random access memory 332, as functionally represented by symbol 182 in FIG. 6. As also shown and preferred in FIG. 6, if power has been lost and the associated power failure-protected memory portion 336 had to be reset to its initial values, as functionally represented by symbol 180, the logic then goes on to the next functional step which is the resetting of all of the aforementioned memory buffers, as previously mentioned. After all memory buffers have been reset, then the various information which is stored in the power failure-protected random access memory is unpacked or unloaded into the data memory portion, as functionally represented by symbol 184 in FIG. 6, this information preferably being, by way of example, user entered data, which may include, by way of example, specific stocks whose activity the user wishes to have displayed on the screen 330 out of a much greater total number of possible stocks which could be displayed. When this information has been unloaded or unpacked from the power failure-protected random access memory portion 336, then the logic resets the last of the other previous user entered information such as the last selected group and page, split screen information, video display information, etc., which are also preferably stored in the power failure-protected random access memory portion 336, this function being represented by symbol 186 in FIG. 6. After all of this user information has been entered and the initialization has been completed, control of the microprocessor 310 and the logic is turned over to the balance of the captured selected main program which comprises the captured selected system program which is contained in the 6 captured consecutively numbered program pages, for operation of the terminal 300 in accordance with this stored selected program. This function is represented by symbol 188 in FIG. 6. Preferably, when the power is turned off for the terminal 300, this temporarily stored selected system program is erased since, preferably, the storage is all semi-conductive memory which conventionally functions to erase when power is removed, and the system is returned to this initial state awaiting turn on and initial operation under control of the aforementioned hardware bootstrap program (FIG. 4). If desired, of course, the temporarily stored main program may be replaced by a subsequently called up main program without turn off of the terminal merely by selecting a new main or control program for the terminal 300 and overwriting the previously selected temporarily stored main program with the newly selected or called up main program. As was also previously mentioned, with respect to the once-only initialization program and the previously stored software bootstrap, these two program components are overwritten by data during the operation of the terminal 300 under control of the system program since these previously mentioned program portions were stored in the data portion of the memory. A typical once-only initialization program listing is provided below which listing is also preferably written, by way of example, in M6800 assembler language for use with a conventional Motorola M6800 computer 310, with the symbols utilized therein being those conventionally utilized in M6800 assembler language.

```
M6800  ASSEMBLER     V004        FOR ZF INITIALISATION SEGMENT 3/22/76

2356          8490  WF     EQU      *
2357          0000         ORG      $1100
2358                *
2359                *      XINIT
2360                *      ----
2361            -   *ONCE ONLY INITIALISATION
2362                *      CALLED WHEN SOFTWARE BOOTSTRAP HAS
2363                *      BOOTED 4K PROGRAM INTO $8000->$8FFF
2364                *      & 720-WD XINIT INTO $1100->$FCF
2365                *      ($20->$2F = PERM MEM PTRS, $30->$7FF
2366                *      = 0 + PERM MEMORY, EXCEPT SPAD, DKGP->,
2367                *      DFFKTN & DFCRW->DFCRA+14: DFCRNP->
2368                *      DFCRA+14 = 127).
2369                *RESETS REST OF PTRS & DATA.
2370                *UNPACKS POWER-PROTECTED RAM.
2371                *ENTERS BASE LOOP.
2372                *      AS THIS PROGRAM RESIDES IN BUFFER
```

```
2373                *       AREA, IT IS SPLIT INTO 2 PARTS:
2374                *       1) THE 1ST 8 OF THE LAST 9 37-WORD
2375                *          BUFFERS HOLD PROGRAM TO RESET BUFFERS
2376                *          AND UNPACK POWER-PROTECTED RAM - AS
2377                *          THESE BUFFERS ARE FREE, THEY NEED ONLY
2378                *          THEIR 1ST WORDS TO BE PRESET;
2379                *       2) THE REST OF THE PROGRAM AREA MUST
2380                *          BE RESET BY XINIT, SO IS USED TO RESET
2381                *          PIA'S AND DATA BEFORE IT IS CLEARED.
2382                *
2383                *
2384                        *COPY OF TABLES HELD IN BOTTOM 4K RAM
2385                        *1) PROGRAM VECTOR LIST
2386 0D00  8144    TILIST  FDB     JETMRZ
2387 0D02  98A7            FDB     JFNCR3
2388 0D04  995F            FDB     JFUCR1
2389 0D06  9A20            FDB     JKBD1
2390 0D08  873E            FDB     JPDRV1
2391 0D0A  8856            FDB     JQCON3
2392 0D0C  88DA            FDB     JTDRV2
2393 0D0E  8A79            FDB     JVDRV2
2394 0D10  9E86            FDB     JVERD3
2395 0D12  9E83            FDB     JVERN3
2396 0D14  9F27            FDB     JVINT1
2397 0D16  89E4            FDB     JWPER3
2398 0D18  8A10            FDB     JWPRT1
2399                        *2) STANDARD MESSAGES
2400 0D1A  OF              FCB     15
2401 0D1B  53              FCC     /SYSTEM OFF-LINE/
2402 0D2A  17              FCB     23
2403 0D2B  20              FCC     /       REUTER MONITOR/
2404 0D42  12              FCB     18
2405 0D43  41              FCC     /ALERT           /
2406 0D55  0B              FCB     11
2407 0D56  4E              FCC     /NYSE TICKER/
2408 0D61  0B              FCB     11
2409 0D62  41              FCC     /AMEX TICKER/
2410 0D6D  12              FCB     18
2411 0D6E  20              FCC     /    (PRINT HALTED)/
2412 0D80  17              FCB     23
2413 0D81  20              FCC     /      (PRINT INTERRUPTED)/
2414                *
2415            0DA0        ORG     $DA0
2416                        *INIT REST OF PIA'S
2417 0DA0 CE 4024  XINIT   LDX     #FTKRD*256+FTKRC
2418 0DA3 FF 1200          STX     PTKR    INIT TICKER
2419 0DA6 CE 0024          LDX     #FUCPID*256+FUCPIC
2420 0DA9 20 3A            BRA     BIN001
2421            0DE5        ORG     $DE5
2422 0DE5 FF 1A00  BIN001  STX     PUCPI   INIT PCP I/P
2423 0DE8 CE FF24          LDX     #FUCPOD*256+FUCPOC
2424 0DEB FF 1A02          STX     PUCPO   INIT PCP O/P
2425 0DEE CE FF24          LDX     #FWSPD*256+FWSPC
2426 0DF1 FF 1800          STX     PWSP    INIT WSP
2427 0DF4 CE FF24          LDX     #FPRTD*256+FPRTC
2428 0DF7 FF 1C02          STX     PPRT    INIT PRINTER
2429 0DFA CE 8007          LDX     #FKBDD*256+FKBDC
2430 0DFD 20 26            BRA     BIN002
2431            0E25        ORG     $E25
2432 0E25 FF 1C00  BIN002  STX     PKBD    INIT KBD
2433 0E28 CE 0305          LDX     #FKBDHD*256+FETMRC
2434 0E2B FF 1802          STX     PKBDHL  INIT TIMER + KBD HORN/LIGHTS
2435 0E2E B6 1200          LDA A   PTKR    START TICKER
2436 0E31 7F 1800          CLR     PWSP    START WSP
2437 0E34 7F 1C02          CLR     PPRT    START PRINTER
2438                *INIT DATA
2439 0E37 86 17            LDA A   #23     INIT VID MEM POINTERS
2440 0E39 CE 0000          LDX     #0
2441 0E3C A7 00    BIN010  STA A   X
2442 0E3E 20 25            BRA     BIN011
2443           0E65         ORG     $E65
2444 0E65 4C    BIN011     INC A
2445 0E66 08               INX
```

```
2446 0E67 81 37              CMP  A  #$55
2447 0E69 2D D1              BLT     BIN010
2448 0E6B 97 50              STA  A  DFPKTN      SET SEGMENT DATA
2449 0E6D CE 0105             LDX     #DEPSTD-1
2450 0E70 DF 30              STX     DECQHD
2451 0E72 CE 3824             LDX     #56*256+@44
2452 0E75 DF 32              STX     DEFREQ
2453 0E77 86 3B              LDA  A  #$3B
2454 0E79 97 34              STA  A  DFCRT
2455 0E7B 20 28              BRA     BIN012
2456         0EA5             ORG     $EA5
2457 0EA5 4F       BIN012    CLR  A
2458 0EA6 97 38              STA  A  DFQNCC
2459 0EA8 97 42              STA  A  DFRCC
2460 0EAA 4A                 DEC  A
2461 0EAB 97 8E              STA  A  DVRWL
2462 0EAD 97 8F              STA  A  DVRWL+1
2463 0EAF 97 AA              STA  A  DWROW
2464 0EB1 44                 LSR  A
2465 0EB2 97 4F              STA  A  DFCRA+21
2466 0EB4 97 56              STA  A  DFCRA+28
2467 0EB6 44                 LSR  A
2468 0EB7 97 39              STA  A  DFCROV
2469 0EB9 97 40              STA  A  DFCROV+7
2470 0EBB 97 47              STA  A  DFCROV+14
2471 0EBD 20 26              BRA     BIN013
2472         0EE5             ORG     $EE5
2473 0EE5 97 74   BIN013    STA  A  DKEQR
2474 0EE7 97 77              STA  A  DKSIZE
2475 0EE9 CE 7E0F             LDX     #$7E*256+$F
2476 0EEC DF 49              STX     DFLCRI
2477 0EEE CE 00C0             LDX     #$55*64
2478 0EF1 DF 51              STX     DFPKTA
2479 0EF3 86 3C              LDA  A  #60
2480 0EF5 97 5B              STA  A  DKPTMT
2481 0EF7 86 06              LDA  A  #6
2482 0EF9 97 60              STA  A  DKQ-1
2483 0EFB CE 0FEE             LDX     #OKECHO+2
2484 0EFE 20 25              BRA     BIN014
2485         0F25             ORG     $F25
2486 0F25 DF 75   BIN014    STX     DKEPTR
2487 0F27 CE 9800             LDX     #WMOFLT
2488 0F2A DF 78              STX     DMBSTK
2489 0F2C 86 80              LDA  A  #TVMWFS/256
2490 0F2E 97 99              STA  A  DVMWTP
2491 0F30 CE 9EE8             LDX     #IVBINT
2492 0F33 DF 9D              STX     DIVVEC
2493 0F35 CE 0119             LDX     #TEPVLS     SET UP FIXED TABLES
2494 0F38 B6 0100  BIN020    LDA  A  TILIST
2495 0F3B A7 00              STA  A  X
2496 0F3D 20 26              BRA     BIN021
2497         0F65             ORG     $F65
2498 0F65 7C 0F3A BIN021    INC     BIN020+2
2499 0F68 08                 INX
2500 0F69 8C 01C0             CPX     #$1C0
2501 0F6C 26 CA              BNE     BIN020
2502         *CHECK POWER-PROTECTED RAM
2503 0F6E CE 97BC             LDX     #TIPPCS+8
2504 0F71 86 11              LDA  A  #$11
2505 0F73 80 02   BIN030    SUB  A  #2
2506 0F75 2A 2E              BPL     BIN035      MORE TO CHECK?
2507 0F77 7E 00C8             JMP     BIN060      ALL OK
2508         0FA5             ORG     $FA5
2509 0FA5 09       BIN035    DEX
2510 0FA6 E6 00              LDA  B  X
2511 0FA8 C4 0F              AND  B  #$F
2512 0FAA 11                 CBA
2513 0FAB 27 C6              BEQ     BIN030
2514 0FAD A7 00   BIN040    STA  A  X          RESET PP RAM:
2515 0FAF 09                 DEX                CHECK WORDS
2516 0FB0 80 02              SUB  A  #2
2517 0FB2 2A F9              BPL     BIN040
2518 0FB4 6F 00   BIN050    CLR     X          CLEAR PACKED M/W TABLES
```

```
2519 OFB6 09                          DEX
2520 OFB7 8C 93FF                     CPX      #TIMWPK-1
2521 OFBA 26 F8                       BNE      BIN050
2522 OFBC CE FFFF                     LDX      #-1          RESET DEFAULT G/P ETC:
2523 OFBF FF 97A2                     STX      TIGPPK+6     @ TOP
2524 OFC2 FF 97A4                     STX      TIGPPK+8     @ BOTTOM
2525 OFC5 86 02                       LDA  A   #2
2526 OFC7 B7 97A1                     STA  A   TIGPPK+5     GRP/PGE
2527 OFCA 7E 0DC0                     JMP      BIN051
2528            0DC0                  ORG      $DC0
2529 0DC0 86 08         BIN051        LDA  A   #8
2530 0DC2 B7 97A6                     STA  A   TIGPPK+10    @ STOCK
2531 0DC5 B7 97B3                     STA  A   TIGPPK+23    KBD KEY
2532                   *RESET BUFFERS
2533 0DC8 CE 0800       BIN060        LDX      #$800
2534 0DCB C6 16                       LDA  B   #22
2535 0DCD 86 40         BIN070        LDA  A   #64
2536 0DCF 5D            BIN080        TST  B
2537 0DD0 2A 04                       BPL      BIN090       BUFFERS BELOW PROGRAM?
2538 0DD2 81 18                       CMP  A   #27
2539 0DD4 2E 02                       BGT      BIN095       DON'T CLEAR REST OF PROGRAM
2540 0DD6 6F 00         BIN090        CLR      X
2541 0DD8 08            BIN095        INX
2542 0DD9 4A                          DEC  A
2543 0DDA 2E F3                       BGT      BIN080
2544 0DDC 5A                          DEC  B
2545 0DDD 8C 1000                     CPX      #$1000
2546 0DE0 26 EB                       BNE      BIN070
2547 0DE2 20 1D                       BRA      BIN096
2548           0E00                   ORG      $E00
2549 0E00 39                          FCB      $39
2550 0E01 7F 0FC0       BIN096        CLR      $FC0         RESET LAST FREE 37-WD BUFFER
2551 0E04 86 10                       LDA  A   #16
2552 0E06 B7 0FEE                     STA  A   $FEE         RESET ECHO BUFFER CT
2553                   *UNPACK M/W TABLES
2554 0E09 CE 010A                     LDX      #TE2/D-11    INIT UNPACKED POINTER
2555 0E0C C6 38                       LDA  B   #56          INIT STOCK CT
2556 0E0E 37                          PSH  B
2557 0E0F C6 06                       LDA  B   #6           INIT STOCK NAME CHAR CT
2558 0E11 D7 84                       STA  B   W3J1         INIT UNPACKING FLAG
2559 0E13 37            BIN105        PSH  B                SET UP NEXT STOCK NAME:
2560 0E14 BD 0F5A                     JSR      LIXUPK       GET NEXT CHAR
2561 0E17 33            BIN110        PUL  B
2562 0E18 C1 05                       CMP  B   #5
2563 0E1A 2D 02                       BLT      BIN120
2564 0E1C 8A 80                       ORA  A   #$80         MARK ONE OF 1ST 2
2565 0E1E A7 0C         BIN120        STA  A   12,X
2566 0E20 08                          INX
2567 0E21 5A                          DEC  B
2568 0E22 20 1D                       BRA      BIN121
2569           0E40                   ORG      $E40
2570 0E40 3A                          FCB      $3A
2571 0E41 2E D0         BIN121        BGT      BIN105
2572 0E43 C6 08                       LDA  B   #FVOPT       SET STOCK STATUS:
2573 0E45 4D                          TST  A
2574 0E46 27 02                       BEQ      BIN130
2575 0E48 E7 05                       STA  B   5,X          OPTION
2576 0E4A C6 05         BIN130        LDA  B   #5           SET STOCK LIMIT:
2577 0E4C 37            BIN140        PSH  B
2578 0E4D BD 0F5A                     JSR      LIXUPK       GET NEXT CHAR
2579 0E50 33                          PUL  B
2580 0E51 A7 17                       STA  A   23,X
2581 0E53 08                          INX
2582 0E54 5A                          DEC  B
2583 0E55 2E F5                       BGT      BIN140
2584 0E57 33                          PUL  B                SEE IF ANY MORE STOCKS:
2585 0E58 5A                          DEC  B
2586 0E59 2F 7B                       BLE      BIN200       ALL DONE?
2587 0E5B 37                          PSH  B
2588 0E5C C6 06         BIN145        LDA  B   #6           GET 1ST CHAR OF NEXT STOCK
2589 0E5E 37                          PSH  B
2590 0E5F 20 20                       BRA      BIN146
2591           0E80                   ORG      $E80
```

```
2592 0E80    3B              FCB         $3B
2593 0E81 BD 0F5A   BIN146    JSR         LIXUPK
2594 0E84 81 30               CMP   A     #'0
2595 0E86 27 08               BEQ         BIN160      2ND 1/2 LONG STOCK?
2596 0E88 C6 35               LDA   B     #53
2597 0E8A 08        BIN150    INX                     UPDATE POINTER
2598 0E8B 5A                  DEC   B
2599 0E8C 2E FC               BGT         BIN150
2600 0E8E 20 87               BRA         BIN110      GET NEXT STOCK
2601 0E90 A6 00    BIN160    LDA   A     X           SET LONG STOCK STATUS
2602 0E92 8A 02               ORA   A     #FVLONG
2603 0E94 A7 00               STA   A     X
2604 0E96 86 04               LDA   A     #FVLON2
2605 0E98 A7 40               STA   A     64,X
2606 0E9A 33       BIN170    PUL   B                 SKIP OVER NAME PART
2607 0E9B 5A                  DEC   B
2608 0E9C 2F 23               BLE         BIN180
2609 0E9E 37                  PSH   B
2610 0E9F BD 0F5A             JSR         LIXUPK
2611 0EA2 20 F6               BRA         BIN170
2612         0EC0              ORG         $EC0
2613 0EC0    3C              FCB         $3C
2614 0EC1 C6 05    BIN180    LDA   B     #5          SET REST OF LIMIT
2615 0EC3 37       BIN190    PSH   B
2616 0EC4 BD 0F5A             JSR         LIXUPK
2617 0EC7 33                  PUL   B
2618 0EC8 A7 16               STA   A     22,X
2619 0ECA 08                  INX
2620 0ECB 5A                  DEC   B
2621 0ECC 2E F5               BGT         BIN190
2622 0ECE C6 38               LDA   B     #59
2623 0ED0 08       BIN195    INX                     UPDATE POINTER
2624 0ED1 5A                  DEC   B
2625 0ED2 2E FC               BGT         BIN195
2626 0ED4 20 86               BRA         BIN145
2627                *UNPACK OTHER DATA
2628 0ED6 CE 0062  BIN200    LDX         #OKGP       INIT UNPACK POINTER FOR G/P
2629 0ED9 C6 03               LDA   B     #3          G/P CT
2630 0EDB 8D 6A    BIN210    BSR         LI4UPK      SET G/P
2631 0EDD A7 00               STA   A     X
2632 0EDF 08                  INX
2633 0EE0 5A                  DEC   B
2634 0EE1 2E F8               BGT         BIN210
2635 0EE3 20 1C               BRA         BIN211
2636         0F00              ORG         $F00
2637 0F00    3D              FCB         $3D
2638 0F01 8D 44    BIN211    BSR         LI4UPK      SET Q TOP
2639 0F03 97 65               STA   A     DKQH
2640 0F05 8D 40               BSR         LI4UPK      SET Q BOTTOM
2641 0F07 97 66               STA   A     DKQL
2642 0F09 C6 06               LDA   B     #6          Q STOCK CT
2643 0F0B 8D 3A    BIN220    BSR         LI4UPK      SET Q STOCK
2644 0F0D A7 09               STA   A     9,X
2645 0F0F 08                  INX
2646 0F10 5A                  DEC   B
2647 0F11 2E F8               BGT         BIN220
2648 0F13 8D 32               BSR         LI4UPK      SET LAST KBD FN KEY (FOR VP)
2649 0F15 97 5C               STA   A     DKCHAR
2650                *START MAIN PROGRAM
2651 0F17 86 09               LDA   A     #KKBD1      RESET VIDEO PHASE
2652 0F19 BD 8F31             JSR         SETII
2653 0F1C 86 05               LDA   A     #KFNCR3-2   SEND NCR'S
2654 0F1E BD 8F25             JSR         SET3I
2655 0F21 96 50               LDA   A     DFFKIN
2656 0F23 20 1C               BRA         BIN221      RESTART F-E
2657         0F40              ORG         $F40
2658 0F40    3E              FCB         $3E
2659 0F41 B7 1602  BIN221    STA   A     PFIIMA
2660 0F44 7E 8478             JMP         XILOOP      ENTER BASE LOOP
2661                *LOCAL S/R TO UNPACK OTHER DATA (8 BITS FROM 2*4 BITS)
2662 0F47 4F       LI4UPK    CLR   A
2663 0F48 8D 04               BSR         LI4ONE      GET MS 4 BITS
```

```
2664  0F4A 48              ASL   A
2665  0F4B 48              ASL   A
2666  0F4C 48              ASL   A
2667  0F4D 48              ASL   A
2668  0F4E 37      L14ONE  PSH   B              GET LS 4 BITS
2669  0F4F F6 979C         LDA   B  116FFK
2670       0F50    W14010  EQU   *-2
2671  0F52 7C 0F51         INC      W14010+1   UPDATE POINTER
2672  0F55 C4 0F           AND   B  #$F
2673  0F57 1B              ABA
2674  0F58 33              PUL   B
2675  0F59 39              RTS
2676                 *LOCAL S/R TO UNPACK M/W CHAR (2*6 BITS FROM 3*4 BITS)
2677  0F5A D6 84   LIXUPK  LDA   B  W3J1          GET FLAG
2678  0F5C C5 10           BIT   B  #$10
2679  0F5E 26 23           BNE      BIX010        ALREADY HAVE LS 2 BITS OF NEXT CHAR
2680  0F60 8D 34           BSR      LJXGC         GET 2*LS 2 BITS
2681  0F62 16              TAB
2682  0F63 20 1C           BRA      BIX009
2683       0F80            ORG      $F80
2684  0F80 3F              FCB      $3F
2685  0F81 CA F0   BIX009  ORA   B  #$F0
2686  0F83 8D 11   BIX010  BSR      LJXGC         GET BS-2 OF NEXT CHAR
2687  0F85 84 0F           AND   A  #$F           INSERT LS 2 BITS
2688  0F87 54              LSR   B
2689  0F88 49              ROL   A
2690  0F89 54              LSR   B
2691  0F8A 49              ROL   A
2692  0F8B D7 84           STA   B  W3J1          SAVE NEW FLAG
2693  0F8D 81 20           CMP   A  #$20          C/V CHAR TO REQD # BITS (6 OR 7)
2694  0F8F 24 02           BCC      BIX020
2695  0F91 8A 40           ORA   A  #$40
2696  0F93 94 77   BIX020  AND   A  DKSIZE
2697  0F95 39              RTS
2698                       *
2699  0F96 B6 9400 LJXGC   LDA   A  TIMWPK        GET NEXT POWER-PROTECTED CHAR
2700       0F97   WIX030   EQU      *-2
2701  0F99 7C 0F98         INC      WIX030+1
2702  0F9C 26 03           BNE      BIX040
2703  0F9E 7C 0F97         INC      WIX030
2704  0FA1 39     BIX040   RTS
2705                       *
2706                       *
2707       849C            ORG      WP
```

The stored system control program could be any conventional system program which can be performed by the system logic which is provided in the terminal 300, such as the normal row grabbing function described in the aforementioned patent as well as any other function capable of being performed by the various logic components contained in the row grabbing terminal 300, and no such typical program need be given in detail.

Referring now to FIG. 7, an overall functional system block diagram of the aforementioned terminal 300, which is controlled in accordance with the aforementioned hardware bootstrap, software bootstrap, once-only initialization and system programs is shown. The terminal 300 preferably includes a conventional comparator 302, a packet buffer 304, a video processor and timing control portion 306, a conventional tuner and demodulator 308 which provides demodulated video to portion 306, the aforementioned central processor 310, which is preferably the aforementioned Motorola M6800 microprocessor, the microprocessor 310 preferably having conventional associated I/O devices such as Motorola M6820s conventionally connectable thereto, to such typical I/O devices being diagrammatically illustrated in FIG. 7 by blocks 312 and 314. The terminal 300 may also preferably include a conventional hard copy printer 316 if such hard copy printing is desired together with a conventional printer interface 300 for interfacing the printer 316 with the computer or microprocessor 310, and may also include a conventional wire service printer 320 which is interfaced with computer 310 through a conventional printer interface 318 if such is desired. In addition, if ticker information is to also be provided, a conventional ticker interface 322 is then preferably included in terminal 300. A conventional keyboard 324 for enabling selection of desired information and/or desired main or control system programs is also preferably provided. A conventional character generator 326 is also preferably included in the terminal 300, with the output of character generator 326 being preferably provided to a conventional video synchronizing recombiner 328 which also preferably receives the vertical and horizontal sync and which, in turn, provides the input signal to the aforementioned display CRT 330. The terminal 300 also preferably includes in its memory the aforementioned random access memory portion 332, read only memory portion 334, which stores the hardware bootstrap program, power failure-protected random access memory portion 336 and a parity generation and check portion 338. Preferably, the terminal 300 also includes a conventional type of direct memory access sequencer 340 which shall be described in greater detail with reference to FIG. 8. In addition, the microprocessor 310 preferably has a conventional associated crystal controlled two-phase clock 342 associated therewith.

The terminal 300 shall initially be described solely with respect to the function of downstream program loading; this is, the obtaining of a remotely provided main or control program for operation of the terminal 300 from a remote data base. Thereafter, the terminal 300 shall generally be described with reference to its operation in accordance with a typical grabbed or downstream loaded system control program, such as the system control program which enables the terminal 300 to operate in conventional fashion to perform the row grabbing function which was previously described in the aforementioned patent and patent applications.

As previously mentioned, the aforementioned hardware bootstrap program which was described with reference to FIG. 4, is preferably stored in the read only memory portion 334 of the memory for provision to the microprocessor 310 for control thereof in accordance therewith. Referring back to the aforementioned hardware bootstrap program of FIG. 4, and specifically to the functional step 112 entitled "Set Up Hardware to Capture All Software Bootstrap Packets", in accomplishing this, the comparator 302 is preferably conventionally loaded with a comparison word which corresponds to special character 32 which, in the example given, implies that the captured program row is associated with the software bootstrap program. Comparator 302 then functions in conventional fashion to compare all transmitted and received packets or rows against this comparison word to determine if the packet being received is a software bootstrap packet. The packets of information which are preferably continuously transmitted and received are preferably initially provided to the packet buffer 304. If the comparator 302 provides a compare signal, that is if the information or packet provided is a software bootstrap packet, then the compare signal is provided through I/O device 312 to the direct memory sequencer 340. In response thereto, a conventional multiplexer switch 350 is controlled to thereby provide the content of packet buffer 304 to random access memory portion 332 under control of the direct memory access sequencer 340 to thereby load the aforementioned software bootstrap packet into the aforementioned designated or assigned portion of the random access memory 332 which was previously described with references FIGS. 4 through 6, the aforementioned software bootstrap program preferably being loaded into the normal data assigned portions of the memory 332 since, as previously mentioned, the software bootstrap is subsequently written over by data when its function has been accomplished. As previously mentioned, this operation is preferably repeated in accordance with the hardware bootstrap program (FIG. 4) for each captured software bootstrap packet of 24 program words until the entire 720 program words associated with the software bootstrap program have been captured. Then, as previously described with reference to FIG. 4, when the software bootstrap has been completely captured or loaded into the random access memory portion 332, control of the terminal 300 is turned over to the software bootstrap program in order to accomplish the downstream loading of the selected main or control program.

As previously mentioned with reference to FIG. 5, after the software bootstrap program has been loaded into the random access memory portion 332, the microprocessor 310 and memory portion 332 function to perform the comparison check previously described with reference to FIG. 5 in order for the microprocessor 310 to determine whether or not the software bootstrap program has been correctly loaded. If the software bootstrap program has not been correctly loaded then, as previously described, the system 300 will return control of the microprocessor 310 to the hardware bootstrap program for reloading of the software bootstrap program until this function has been correctly accomplished. Assuming the software bootstrap program has been correctly loaded, then, as previously mentioned, the microprocessor 310 communicates through I/O device 314 with the character generator 326 and the CRT 330 to conventionally provide the aforementioned "PLEASE WAIT" message on the CRT 330. With respect to the execution of logic functional steps 136 through 164 of the software bootstrap program of FIG. 5, the microprocessor 310 functions in conjunction with the comparator 302 and packet buffer 304, direct memory access sequencer 340, random access memory portion 332 and multiplexer switch 350 to accomplish the loading of the various packets or rows associated with the permission, as well as the various packets or rows associated with the main or control program into the appropriate, previously described portions of the random access memory 332. In accomplishing this, the comparison word which is provided to comparator 302 is, of course, varied in accordance with the desired packet being sought at any particular time by the microprocessor 310. Thus, for the permission packet, the comparator 302 would be "looking for" the appropriate special character, such as 32 in the fourth character position, for recognition of a permission packet which, upon the provision of the compare signal as a result of a match, would subsequently be provided from the packet buffer 304 to the position in in the random access memory 332. Similarly, the comparator 302 would have a particular compare word associated with a particular consecutive program page number of the main or control program which is to be loaded into memory portion 332 and when the particular consecutive program page of the main program being sought is detected by the comparator 302, the particular captured packet associated therewith will be provided from packet buffer 304, through multiplexer switch 350 under control of the direct memory access sequencer 340, to the appropriate memory position in memory 332, this repetitively being accomplished in the manner described with reference to FIG. 5 until all of the packets, that is all 30 packets by way of example, associated with a given consecutive program page of the program have been loaded into memory 332. When this occurs, the comparator 302 is then incremented so that it then compares or looks for the next subsequent program page in the 7 pages associated, by way of example, with the main or control program, this operation being repeated until all 7, by way of example, consecutively numbered pages of the selected main program have been appropriately loaded into memory 332. As also previously mentioned, the compare word associated with the first program page of the main or control program being sought by the microprocessor 310 is preferably located, by way of example, in character positions 29 through 31 of the permission packet 1204 which was previously loaded into the random access memory portion 332, as previously described with reference to FIG. 3. With respect to logic functional steps 166 and 170, these exclusive OR operations are accomplished between the microprocessor 310 and the random access memory 332 in order to determine whether or not the main control program, including the once-only initialization program portion, has been correctly loaded into memory 332. If either this once-only initialization program portion or the system program portion of the main or control program has not been correctly loaded into memory 332, then, as previously mentioned, control of the system is returned to the aforementioned hardware bootstrap program for reloading of the software bootstrap program with the then subsequent reloading of the main or control program until both the system control program portion and the once-only initialization portion of the main program have been correctly loaded.

Assuming that they have been correctly loaded, as previously mentioned, control of the system with respect to the downstream program loading operation thereof is then turned over to the once-only initialization program previously described with reference to FIG. 6. Then, under control of this once-only initialization program portion, the I/O devices 312 and 314 are preferably initialized in conventional fashion so as to be set up in order to preferably interface in conventional fashion with the various components associated with these I/O devices 312 and 314. As also previously mentioned with respect to FIG. 6, the power failure-protected random access memory portion 336 is also examined, as indicated by functional step 178, to see whether or not power has been lost, which function is preferably accomplished by means of a conventional software comparison of a designated word in the once-only initialization program with a word stored in the power failure-protected random access memory portion 336. If a compare exists, then the system assumes that power has not been lost; however, if this word is not located, that is if no compare exists, then the system assumes that power has been lost. With respect to the logic functional step 182 of resetting all buffers, this refers to the buffers located in the random access memory 332 and preferably refers to identifying these buffers as being available to receive information as opposed to necessarily clearing these buffers. With respect to the information preferably contained in the power failure-protected random access memory portion 336, this information is preferably rearranged and loaded in usable fashion into random access memory portion 332, as functionally indicated by steps 184 and 186 in FIG. 6. After this has been accomplished, control of the system 300 is then turned over to the main or control program, which is functionally represented by symbol 188 in FIG. 6.

It should be noted that preferably the I/O device 314 may have a portion thereof which can be designated as a processor controlled port for enabling subsequent transfer of called up programs to another device other than the terminal 300. Thus, terminal 300 could call up a program which is subsequently provided via these processor control ports to a remote device which is to be controlled by that program. In other words, the terminal 300 in this manner could act as a loader program for the subsequently provided main program to the remote device or, if desired, could interact with this remotely loaded program to operate the remote, or any other desired control function.

Figure 8:
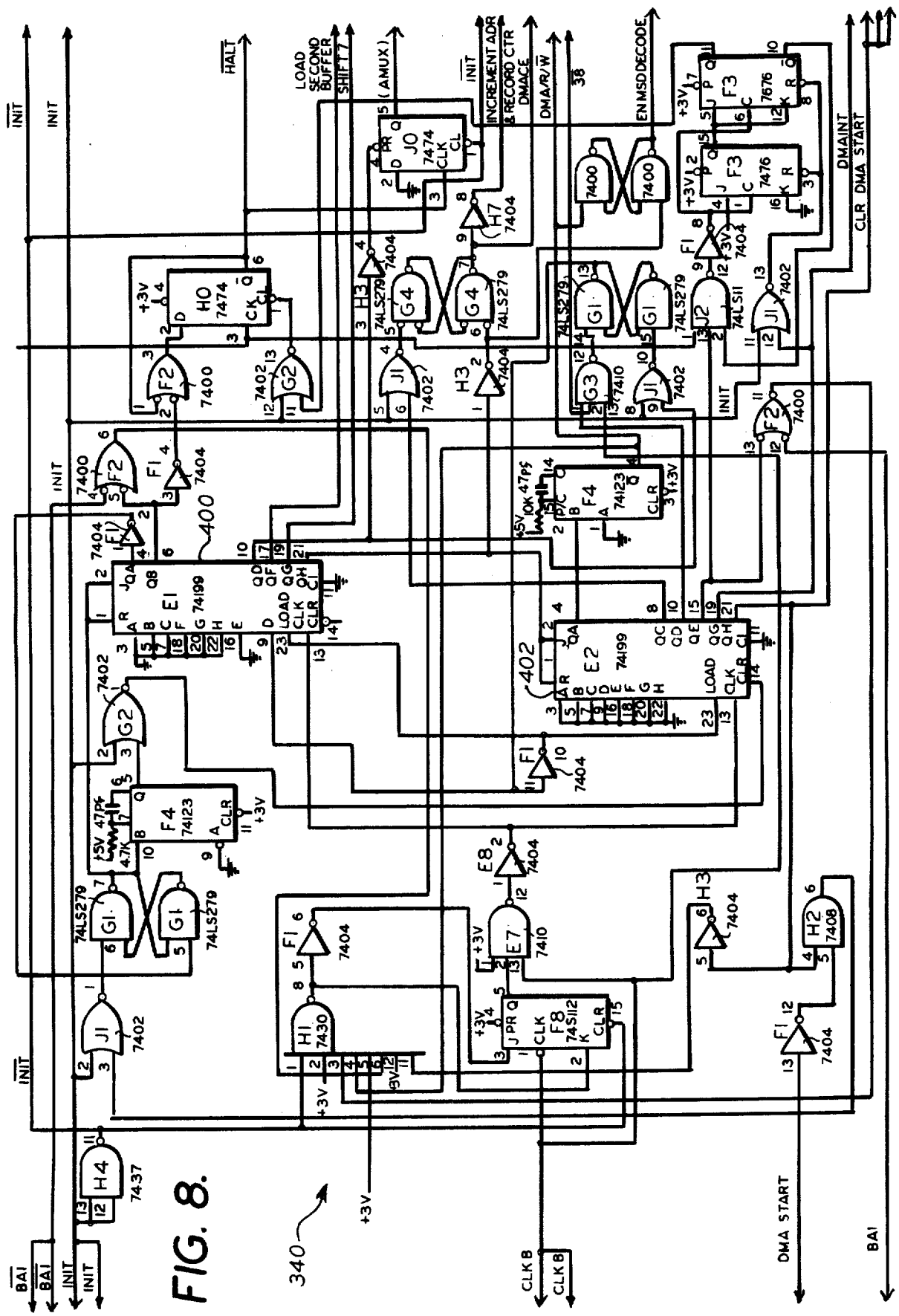
FIGS. 8 and 9 comprise a logic schematic diagram of the preferred direct memory access sequencer portion of the system of FIG. 7.
Figure 9:
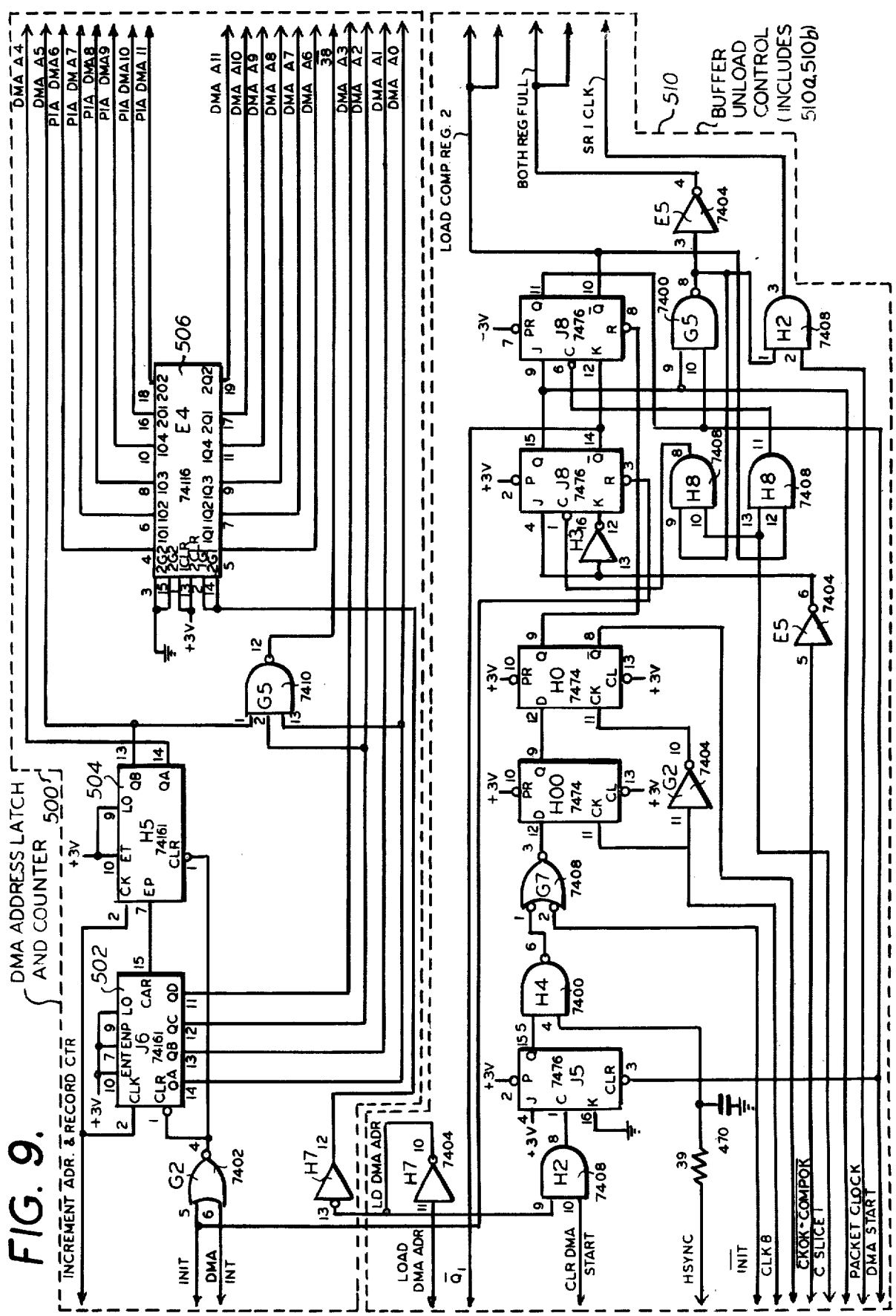
Figure 10:
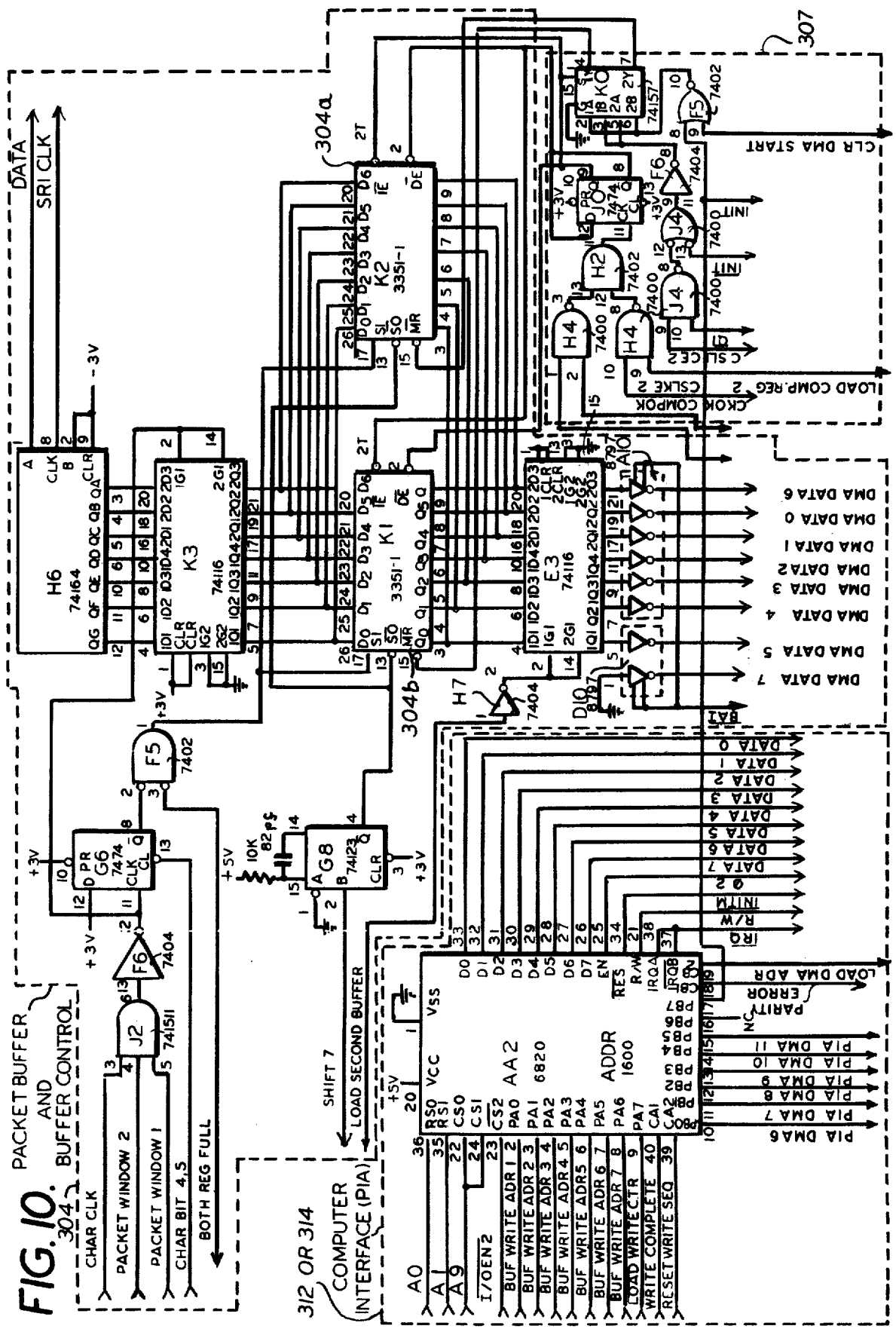
FIG. 10 is a logic schematic diagram of the preferred packet and buffer control portion of the system of FIG. 7 and further illustrates a typical interface portion of the system of FIG. 7.

Referring now to FIG. 8, the direct memory access sequencer 340 is shown in greater detail. This sequencer 340 preferably comprises a pair of conventional sequencer shift registers 400 and 402 with conventional associated logic circuitry for providing timing and control signals in order to perform the following functions which are to control the operation of the microprocessor 310 in an orderly manner; to control the data and address multiplexer switches 350 and 351 (FIG. 7); and to control the packet buffer 304 in the manner previously described in order to insure that the packets being provided to the system 300 are properly loaded into the appropriate locations in the random access memory 332. Direct memory accessor 340, as shown in FIG. 9, preferably includes an address latch and counter portion 500 which is preferably a source of address to the random access memory 332 when information is transferred from packet buffer 304 into random access memory 332. The address latch and counter 500, as shown and preferred, preferably includes conventional synchronous up counters 502 and 504 and a conventional data latch 506 with appropriate conventional associated logic. As shown and preferred in FIGS. 7 and 9, the direct memory access sequencer 340 also has an associated conventional buffer unload control 510 which has a portion 510a located in the sequencer 340 and another portion thereof 510b preferably located in the packet buffer 304, portions 510a and 510b preferably being interconnected via the control line termed "FIFO control" (FIG. 7). The packet buffer 304, which preferably contains a plurality of buffers, is preferably unloaded into the random access memory 332 under control of the direct memory access sequencer 340 in accordance with the buffer unload control 510. Buffer unload control 510 also preferably determines whether the other packet buffer or buffers in packet buffer 304 which are not being unloaded are available to receive incoming information. This buffer unload control 510, as shown and preferred in FIG. 9, preferably comprises conventional logic circuitry such as a plurality of conventional J-K flip-flops and D-type flip-flops with associated conventional logic. Referring to FIG. 10, the packet buffer 304 is shown in greater detail with the packet buffer 304 preferably comprising a pair of conventional buffers 304a and 304b and associated conventional logic such as conventional logic for accomplishing a serial-to-parallel conversion of the incoming data being loaded into the packet buffers 304a and 304b. Packet buffer 304 also preferably includes a conventional output holding register 305 for containing the output of the particular packet buffer 304a and 304b being unloaded to the random access memory 332. Conventional logic circuitry 307 is also preferably provided for controlling the flow of information into and out of the conventional buffers 304a and 304b. Two buffers 304a and 304b are preferably provided so as to enable the capability of capturing two adjacent packets in the data stream. A typical conventional I/O device 312, or 314 used with the microprocessor 310 and the associated devices previously described with reference to FIG. 7 is shown in FIG. 10 and need not be described in greater detail hereinafter.

Figure 11:
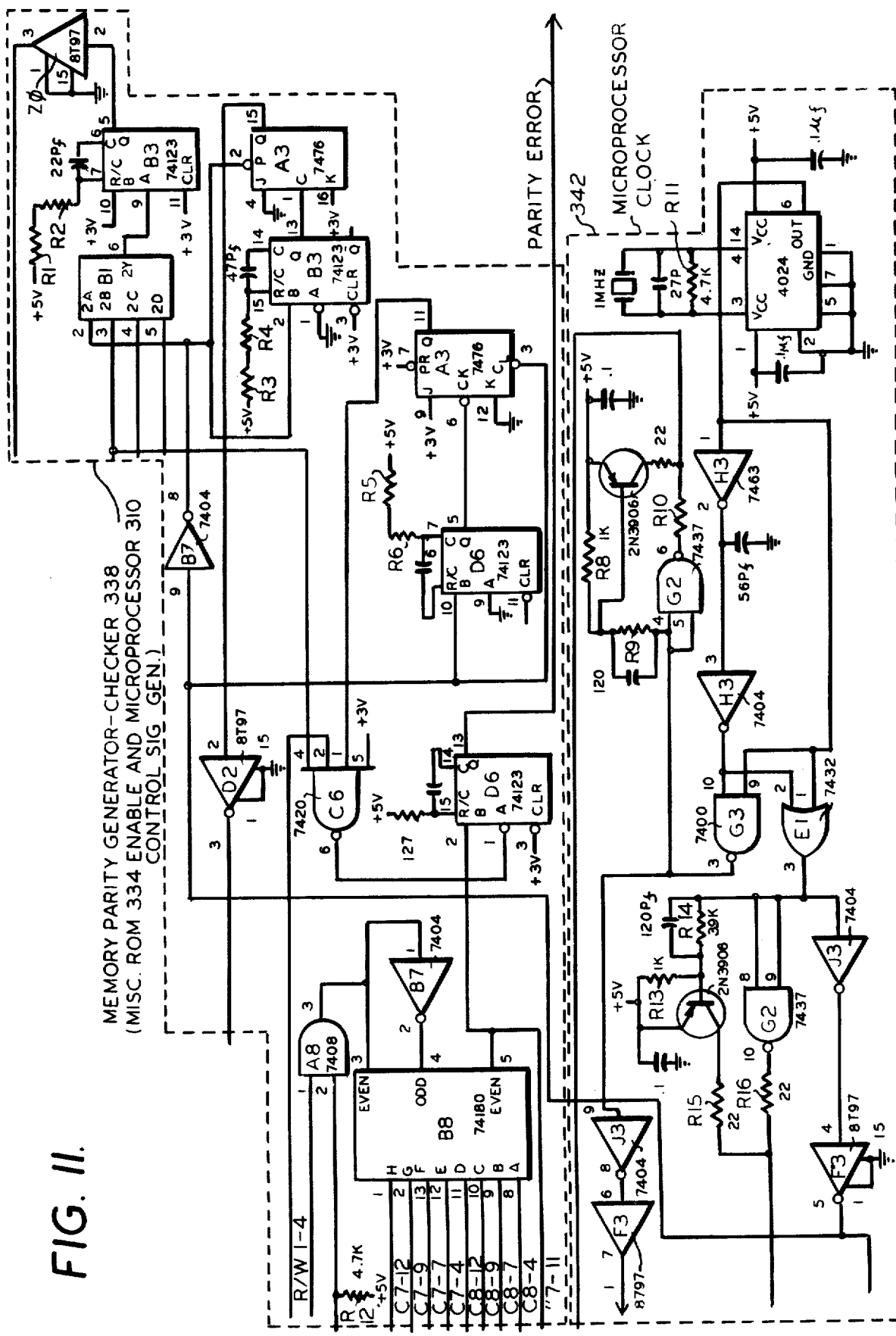
FIG. 11 is a logic schematic diagram of the microprocessor clock portion of the system of FIG. 7.

Referring now to FIG. 11, the microprocessor two phase clock 342 is shown in greater detail. This clock is conventional and will not be described in greater detail hereinafter. Preferably, the aforementioned parity generation and check portion 338 of the memory functions so as to conventionally check memory parity of the information which is being provided from the random access memory 332 during the operation of the microprocessor 310 in accordance therewith. In accomplishing this, a parity bit is preferably generated for each 8 bit program word provided from the random access memory 332 and checked whenever memory is read. If parity does not exist for any one of these 8 bit program words, then the system preferably, once again, returns control thereof to the hardware bootstrap program for, once again, reloading of the software bootstrap program and subsequent reloading of the main or control program, since the control program is stored in memory 332 and any interruption or or error in this stored information could cause the sytem 300 to incorrectly operate. If such a high level of security is not desired, of course, then the parity generation and check function 338 can be omitted. It should be noted that in accordance with the power failure-protected feature, power failure-protected RAM 336 is preferably fed by a DC battery source whenever main power is removed from this RAM 336. Logic functions associated with the microprocessor 310 as well as the other logic components previously generally described with reference to FIG. 7, are all preferably conventional functioning logic components which are conventionally connected so as to function in accordance with the aforementioned hardware bootstrap and software bootstrap programs to enable the loading of the selected main or control program into the conventional random access memory 332, and, accordingly, these logic components will not be described in any further detail. The video processor portion of the video processor and timing control 306 is preferably identical with that previously described in the aforementioned patent and patent applications, with the timing control portion thereof preferably conventionally providing all of the appropriate timing signals for controlling the properly timed operation of the circuitry, with the exception of the microprocessor 310, such as the previously aforementioned compare functions, direct memory access sequencer 340 transfer of packets from the packet buffer 304 to the random access memory 332, etc. The control of the microprocessor 310, however, is preferably controlled by the aforementioned microprocessor clock 342. The aforementioned timing control circuitry 306 is preferably similar to that utilized in the aforementioned patent and patent applications for obtaining timing control with, however, conventional modifications being accomplished where necessary to change the timing of certain signals to enable proper control thereof to accomplish the aforementioned downstream program loading function of the system in accordance with the previously described program row transmission, etc.

Summarizing the above detailed description of the system 300 of the present invention, and referring once again to FIG. 7, the function of the video processor and timing control circuit 306 is to preferably condition the demodulated video input signal and generate the basic system timing signals which are conventionally derived from the demodulated data packets by a conventional phase locked loop. The output of this phase locked loop, as in the aforementioned patent and patent applications, is the master or prime clock for the system. Processor 306 conventionally divides the demodulated video into its three components, horizontal sync, vertical sync and data. Preferably, between each horizontal sync, which function as a record separator, is a data packet preferably comprising 38 seven bit words. The aforementioned horizontal and vertical sync signals are conventionally utilized to reset the previously described decoding circuits necessary to analyze and process the data packet which follows them in accordance with the aforementioned patent and patent applications. As was previously mentioned, the function of the comparator 302 is to check this incoming data packet provided from processor 306 for the various mentioned attributes, substantially all of which are preferably supplied from microprocessor 310 except for any which may be hand-wired into the comparator 342. These attribute comparisons are preferably performed at a relatively fast rate and, accordingly, a separate buffer is preferably made available to microprocessor 310 therefor, with microprocessor 310 updating this buffer at a relatively slow rate with a new attribute and providing it into the primary comparison buffer of comparator 302 at the appropriate time. Preferably, when a comparison is made, the flag associated with the particular attribute is set with these flags preferably being double buffered to enable two back-to-back packets to be processed, as previously mentioned. The packet buffer 304 temporarily stores each of these incoming packets which, as shown in FIG. 7, are provided both to comparator 302 and packet buffer 304 from processor 306, until a comparison is made, this packet being held in buffer 304 until being direct memory accessed (DMA'ed) into main memory 332, as previously mentioned, upon a satisfactory comparison. The use of the aforementioned two buffers 304a and 304b enables one buffer 304b, for example, to temporarily store a second good data packet while another data packet is being DMA'ed into main memory 332. As previously mentioned, the main memory RAM 332 preferably consists, by way of example, of 8K by 9 bit words, the ninth bit preferably being a parity bit, with the RAM 332 preferably being segmented into two 4K areas, by way of example, 4K for data storage and 4K for program storage, in the 65K, by way of example, address space of microprocessor 310. The address lines are preferably conventionally driven by the microprocessor 310 or DMA sequencer 340 address counter and the data lines are preferably driven by the microprocessor 310 or by the packet buffer 304. The DMA sequencer 340 preferably controls both the source of the address and data lines as well as the read/write and check enable lines. As previously mentioned, parity generation 338 preferably takes place with every write and parity check preferably takes place with every read of memory 332. The hardware bootstrap loader program and various utility programs, if desired, are preferably stored in the ROM 334 which is, by way of example, 1K by 8 bits, and the aforementioned user information is stored in the power failure-portected RAM 336 which is, by way of example, 1K by 4 bits and is preferably protected from a power failure, such as for 48 hours, by a rechargeable battery pack which is trickle charged during normal operation and supplies voltage to the protected area 336 of RAM in the event of a power failure to prevent loss of the information stored therein. The aforementioned microprocessor 310 associated with the main memory, which is preferably by way of example, as previously mentioned, a Motorola M6800 microprocessor, is the central processing unit for the system 300 and preferably all communication between the various components of the system 300 is done therethrough. For example, microprocessor 310 generates DMA addresses and comparator attributes and interfaces with the peripherals via interfaces with the peripherals via interfaces 312, 314; it supplies information to the character generator 326 and printers 316, 320; takes in data from the ticker input 322 and keyboard 324; and provides a portion of the interface 314 to be used as the aforementioned processor controlled port for interfacing with a secondary processor. The input to the ticker interface 322 is preferably either EIA or current loop with one of two ticker inputs thereto (New York Stock Exchange or American Stock Exchange, for example) being selected by the microprocessor 310. Data to be printed is sent to the printer interface 318 from interface 314, with interface 318 preferably conventionally converting the parallel data provided thereto to a serial asynchronous format and sending the data at 300 baud, by way of example, to the printer 316 over an EIA line. The aforementioned DMA sequencer 340 preferably conventionally performs the steps necessary to move data temporarily stored in packet buffer 304 to main RAM memory 332 such as "halt processor 310"; take control of data address and control lines to memory 332"; with information in the packet buffer 304 to RAM 332"; "un-halt processor 310"; and "send DMA complete interrupt to processor 310." The processor 310 is then interrupted, signifiying that a DMA has been completed and the processor 310 then preferably sends out a new address to the DMA sequencer 340 address register and returns it to its normal operating mode. The character generator 326 which preferably conventionally converts the binary information input from the microprocessor 310 to serial video data which is conventionally recombined with horizontal and vertical sync and sent to the CRT 330 for display, has a video memory which consists of, by way of example, 1K by 7 bit words, which is sufficient memory to preferably fill the CRT screen 330 with 16 rows of 64 characters each, and is preferably updated by the microprocessor 310 during horizontal sync with a preferred maximum update rate of 1 character every other horizontal sync. A 16 bit shift register in the character generator 326 preferably holds a bit pattern which determines whether each of the 16 rows is 32 or 64 characters in length with this register preferably being serially loaded by the microprocessor 310 during the vertical blanking period. This completes the above summary of the system 300.

It sould be noted that once the selected main control program has been loaded, assuming, for example, that the program is the row grabbing program utilized for control of the terminal 300 as a conventional row grabbing video display terminal of the type previously described in the aforementioned patent, the terminal 300 will then function in conventional fashion under control of this downstream loaded program as such a row grabbing video display terminal. Of course, as previously mentioned, once the terminal 300 is turned off, a new control program to accomplish the row grabbing function would then have to be downstream loaded from the remote data base in the manner previously described due to the erasure of the previously stored program on turn off of the terminal 300. Thus, any control program, as previously mentioned, which could be accomplished by the conventional logic provided in the terminal 300 could be selectively loaded into the terminal 300 and the terminal 300 then controlled in accordance therewith to achieve whatever desired functions are enumerated in the control program, such as by enabling the user to set "buy" or "sell" limits of interest for selected stocks which video data is transmitted which enables the processor 310 to compare these limits against the real time incoming last stock price captured and provide an alert signal on the screen 330 if it exceeds the preselected limit set by the user, as well as storing this information for later video display, if desired.

Summarizing the above, the terminal 300 of the present invention provides an information retrieval system capable of capturing packets or rows of data and/or control program instructions from a continuously transmitting remote data base comprising a plurality of different control programs and different data rows to provide a selected purpose variable function terminal whose information display as well as the particular type of processing thereof can individually be substantially simultaneously varied for each terminal of a plurality of terminals. Thus, every user is not only capable of individually determining what video displayable information is to be received but also how the particular user terminal which receives this information is to process it, all of which is continuously transmitted over a common television distribution system for the video information.

What is claimed is:

1. An information retrieval system comprising a remote information source for remotely continuously transmitting information in a common predetermined format over a common predetermined video signal transmission media; and a local selectable purpose variable function terminal operatively connected to said remote information source via said common video signal transmission media for selectably receiving said remotely continuously transmitted information, said remote information source continuously transmitted information comprising continuously transmitted video displayable data and a plurality of continuously transmitted different sets of control instructions for said terminal, said transmitted video displayable data comprising a first plurality of pseudo video scan lines, each of said first plurality of pseudo video scan lines having a television video scan line format and capable of comprising a first complete self-contained packet of digital information sufficient to provide a displayable row of video data characters, each of said sets of control instructions corresponding to a different selectable purpose for said terminal, at least one of said purposes corresponding to control of the processing of said continuously transmitted data for providing a processed video display thereof, said terminal comprising microcomputer means for controlling the operation thereof to process said transmitted data in accordance therewith, said microcomputer means being operatively connected to said video signal transmission media for receiving said remotely continuously transmitted information, said different sets of control instructions comprising different sets of control instructions for said microcomputer means for varying the operation thereof to vary the type of processing of said transmitted data by said terminal in accordance therewith, selection means operatively connected to said microcomputer means for variably selecting said data to be processed for providing said processed display and a first selectable purpose for said terminal for controlling said processing of said data in accordance therewith from a plurality of different selectable purposes for said terminal, said selectable purposes being variable, local storage means for selectably retrievably locally storing both said selected remotely transmitted displayable data and said selected first one of said remotely transmitted selected set of control instructions for said microcomputer means corresponding to said first selected purpose for said terminal, said local storage means being operatively connected to said microcomputer means with at least said selected data storage therein being continuously updateable in response to said remotely continuously transmitted data being updated, said microcomputer means being operable in accordance with said locally stored remotely transmitted selected first one of said selectable sets of control instructions, and video display means operatively connected to said microcomputer means, said microcomputer means selectively enabling said processed video display of said selected remotely continuously transmitted updateable video displayable data, said selected continuously transmitted updateable remotely transmitted video displayable data being processed in said terminal in accordance with said locally stored remotely transmitted selected first one of said selected set of control instructions for providing said processed video display therefrom on said display means, said selection means enabling local storage in said local storage means of a different one of said plurality of remotely transmitted sets of instructions in place of said first one of said locally stored selected remotely transmitted selected set of instructions in response to selection of a different selected purpose, said microcomputer means differently processing said incoming video displayable date in accordance with said different locally stored set of instructions for said microcomputer means, whereby a local downstream program grabbing and data display means for remotely transmitted information is provided.

2. An information retrieval system in accordance with claim 1 wherein said continuously remotely transmitted plurality of different sets of control instructions comprises a first plurality of continuously remotely transmitted different selectable sets of microprocessor processing control instructions for said terminal and a common second set of continuously remotely transmitted control instructions for controlling the loading of any selected one of said first plurality of selectable sets of microprocessor processing control instructions into said local storage means, said local storage means comprising a common third set of stored retrievable control instructions for controlling the loading of said common second set of control instructions into said local storage means, said selected one of said loaded first plurality of selectable sets of microprocessor processing control instructions corresponding to said first selectable purpose for said terminal for controlling the processing operation of said selected continuously remotely transmitted video displayable data by said terminal in accordance therewith to provide said processed video display thereof, said selection means enabling said loading of said common second set of control instructions and the subsequent loading of said selection one of said first plurality of microprocessor processing control instructions in response to said selection of said selected one of said first plurality of microprocessor processing control instructions.

3. An information retrieval system in accordance with claim 2 wherein said selection means comprises comparator means and buffer storage means operative connected to said video signal transmission media for receiving said continuously remotely transmitted information and for controlling said loading of said selected one of said first plurality of said continuously remotely transmitted sets of microprocessor processing control instructions, said buffer storage means temporarily storing each of said continuously transmitted sets of microprocessor processing control instructions, said comparator means being operatively connected between said microprocessor means and said buffer storage means for comparing said buffer stored sets of microprocessor processing control instructions with said selected one of said first plurality thereof, said buffer storage means being operatively connected between said comparator means, said microprocessor means and said local storage means for loading a given one of said buffer stored sets of processing control instructions into said local storage means under control of said microprocessor means by said loaded second common set of control instructions when said given one of said buffer stored sets of processing control instructions corresponds to a unique set of processing control instructions of said selected one of said first plurality thereof, whereby said selected one of said first plurality of continuously remotely transmitted processing control instructions may be captured by said terminal and loaded into said local storage means for controlling the subsequent terminal processing of said selected video displayable data in accordance therewith.

4. An information retrieval system in accordance with claim 3 wherein said selection means enables selection of any particular video displayable data packet for providing said processed data display thereof, said buffer storage means further temporarily storing each of said continuously remotely transmitted video displayable data packets for loading a given one of said updateable video displayable data packets into said local storage means under control of said microprocessor means by said loaded selected one of said first plurality of sets of microprocessor processing control instructions when said buffer stored packets of updateable video displayable data corresponds to a selected particular video displayable data packet, said terminal processing said locally stored particular data packet under control of said locally stored selected one of said first plurality of processing control instructions for providing said processed data display thereof, said processed data display being updateable in response to subsequent local storage of an updated data packet corresponding to said previous local stored particular data packet, whereby selected video displayable data may be captured by the terminal from said continuously remotely transmitted data to provide an updateable processed video display thereof.

5. An information retrieval system in accordance with claim 2 wherein said selection means comprises comparator means and buffer storage means operatively connected to said video signal transmission media for receiving said continuously remotely transmitted information and for controlling said loading of said common second set of said continuously remotely transmitted sets of instructions, said buffer storage means temporarily storing each of said continuously transmitted sets of control instructions, said comparator means being operatively connected between said microprocessor means and said buffer storage means for comparing said buffer storage sets of control instructions with said common second set thereof, said buffer storage means being operatively connected between said comparator means, said microprocessor means and said local storage means for loading a given one of said buffer stored sets of control instructions into said local storage means under control of said microprocessor means by said locally stored common third set of control instructions when said buffer stored sets of control instructions corresponds to at least a unique one of said common second set of control instructions, whereby said continuously remotely transmitted common second set of control instructions may be captured by the terminal and loaded into said local storage means for controlling the subsequent loading of said selected one of said first plurality of sets of processing control instructions in accordance therewith.

6. An information retrieval system in accordance with claim 5 wherein said comparator means and buffer storage means further control said loading of said selected one of said first plurality of said continuously remotely transmitted sets of microprocessor processing control instructions, said buffer storage means temporarily storing each of said continuously transmitted sets of microprocessor processing control instructions, said comparator means being operatively connected between said microprocessor means and said buffer storage means for comparing said buffer stored sets of microprocessor processing control instructions with said selected one of said first plurality thereof, said buffer storage means being operatively connected between said comparator means, said microprocessor means and said local storage means for loading a given one of said buffer stored sets of processing control instructions into said local storage means under control of said microprocessor means by said loaded second common set of control instructions when said given one of said buffer stored sets of processing control instructions corresponds to a unique set of processing control instructions of said selected one of said first plurality thereof, whereby said selected one of said first plurality of continuously remotely transmitted processing control instructions may be captured by said terminal and loaded into said local storage means for controlling the subsequent terminal processing of said selected video displayable data in accordance therewith.

7. An information retrieval system in accordance with claim 6 wherein said selection means enables selection of any particular video displayable data packet for providing said processed data display thereof, said buffer storage means further temporarily storing each of said continuously remotely transmitted video displayable data packets for loading a given one of said updateable video displayable data packets into said local storage means under control of said microprocessor means by said loaded selected one of said first plurality of sets of microprocessor processing control instructions when said buffer stored packets of updateable video displayable data corresponds to a selected particular video displayable data packet, said terminal processing said locally stored particular data packet under control of said locally stored selected one of said first plurality of processing control instructions for providing said processed data display thereof, said processed data display being updateable in response to subsequent local storage of an updated data packet corresponding to said previous local stored particular data packet, whereby selected video displayable data may be captured by the terminal from said continuously remotely transmitted data to provide an updateable processed video display thereof.

8. An information retrieval system in accordance with claim 7 wherein said local storage means comprises random access memory means for locally storing said selected one of said first plurality of processing control instructions, said common second set of control instructions and said selected video displayable data packets, and read only memory means for storing said locally stored common third set of control instructions.

9. An information retrieval system in accordance with claim 8 wherein said random access memory means locally stores said selected data packets by at least overwriting said common second set of locally stored instructions under control of said locally stored selected one of said first plurality of processing control instructions.

10. An information retrieval system in accordance with claim 2 wherein said remote information source comprises means for transmitting said video displayable data information as said first plurality of pseudo video scan lines, said first pseudo video scan line having an associated transmission time equivalent to said television video scan line, said first packet of digital information comprising at least address information for said displayable row and data information for said displayable characters in said displayable row, said first pseudo video scan line being a composite video signal, said common video signal transmission media comprising television signal distribution means for distributing said transmitted composite first pseudo video scan line signals to said video display means for providing said processed video display.

11. An information retrieval system in accordance with claim 10 wherein said remote transmitting means further comprises means for transmitting said first and second sets of instructions as second pseudo video scan lines each of which has said television video scan line format and capable of comprising a second self-contained packet of digital information sufficient to provide at least a portion of one of said sets of instructions, said second pseudo video scan line having an associated transmission time equivalent to said television video scan line, said second packet of digital information comprising at least address information for said one set of instructions and data information for said instructions comprising said one set thereof.

12. An information retrieval system in accordance with claim 11 wherein each of said first and second pseudo video scan lines further comprises a horizontal sync signal at the beginning thereof, said horizontal sync signal providing a record separator between adjacent first and second pseudo video scan lines.

13. An information retrieval system in accordance with claim 10 wherein said system further comprises means capable of providing a real time frame grabbing system for substantially instantaneously providing a continuous direct video display of a selectable predetermined video frame of information on said video display means from said continuously transmittable video displayable data information in response to loading of a selected one of said first plurality of processing control instructions corresponding thereto.

14. An information retrieval system in accordance with claim 13 wherein said microcomputer means further comprises means operatively connected between said television signal distribution means and said video display means for processing said distributed composite first pseudo video scan line signals under control of said loaded corresponding selected one of said processing control instructions and capable of providing a displayable video row signal to said video display means from each of said first pseudo video scan line signals pertaining to said selected frame for providing said continuous video display, a predetermined plurality of displayable video rows comprising a displayable video frame of information.

15. An information retrieval system in accordance with claim 14 wherein said controlled processing means comprises means for updating said continuously video displayable selectable frame on a displayable video row-by-row basis dependent on real time data information content of said received first pseudo video scan lines.

16. An information retrieval system in accordance with claim 11 wherein said first and second pseudo video scan line signals provided by said transmitting means each comprise a three level signal having first, second and third signal levels with said first and second packets of digital information varying between said second and third signal levels and said horizontal sync signal information being provided between said first and second signal levels.

17. An information retrieval system in accordance with claim 7 wherein said remote information source comprises means for transmitting said video displayable data information as said first plurality of pseudo video scan lines, said first pseudo video scan line having an associated transmission time equivalent to said television video scan line, said first packet of digital information comprising at least address information for said displayable row and data information for said displayable characters in said displayable row, said first pseudo video row scan line being a composite video signal, said common video signal transmission media comprising television signal distribution means for distributing said transmitted composite first pseudo video scan line signals to said video display means for providing said processed video display, said buffer storage means temporarily storing said continuously transmitted first packets, said local storage means locally storing said particular first packets, said comparing means comparing each of said first packets.

18. An information retrieval system in accordance with claim 17 wherein said remote transmitting means further comprises means for transmitting said first and second sets of instructions as second pseudo video scan lines each of which has said television video scan line format and capable of comprising a second self-contained packet of digital information sufficient to provide at least a portion of one of said sets of instructions, said second pseudo video scan line having an associated transmission time equivalent to said television video scan line, said second packet of digital information comprising at least address information for said one set of instructions and data information for said instructions comprising said one set thereof, said buffer storage means further temporarily storing said continuously transmitted second packets, said local storage locally storing each of said second packets corresponding to said common set of control instructions and said selected one of said processing control instructions, said comparing means further comparing each of said second packets.

* * * * *